United States Patent
Barnacka et al.

(10) Patent No.: US 12,551,163 B2
(45) Date of Patent: Feb. 17, 2026

(54) SYSTEM AND METHOD FOR NONINVASIVE SLEEP MONITORING AND REPORTING

(71) Applicants: Anna Barnacka, Cambridge, MA (US); Karlen Shahinyan, Boston, MA (US)

(72) Inventors: Anna Barnacka, Cambridge, MA (US); Karlen Shahinyan, Boston, MA (US)

(73) Assignee: MindMics, Inc., Cambridge, MA (US)

( * ) Notice: Subject to any disclaimer, the term of this patent is extended or adjusted under 35 U.S.C. 154(b) by 534 days.

(21) Appl. No.: 17/575,630

(22) Filed: Jan. 13, 2022

(65) Prior Publication Data
US 2022/0218273 A1    Jul. 14, 2022

Related U.S. Application Data

(60) Provisional application No. 63/137,040, filed on Jan. 13, 2021.

(51) Int. Cl.
*A61B 5/00*      (2006.01)
*A61B 5/024*     (2006.01)

(52) U.S. Cl.
CPC ............ *A61B 5/4812* (2013.01); *A61B 5/024* (2013.01); *A61B 5/4818* (2013.01);
(Continued)

(58) Field of Classification Search
None
See application file for complete search history.

(56) References Cited

U.S. PATENT DOCUMENTS

| | | | |
|---|---|---|---|
| 2010/0094103 A1* | 4/2010 | Kaplan | A61M 21/00 600/26 |
| 2011/0137197 A1* | 6/2011 | Stahmann | A61M 16/024 607/19 |

(Continued)

FOREIGN PATENT DOCUMENTS

WO   PCT/US2019/017832     8/2019

OTHER PUBLICATIONS

Calabrese, Barbara et al, A System for the Analysis of Snore Signals, Procedia Computer Science 4 (2011) 1101-1108, Elsevier Jan. 1, 2011. International Conference on Computational Science, ICCS 2011.

*Primary Examiner* — Benjamin J Klein
*Assistant Examiner* — Willow Grace Welch
(74) *Attorney, Agent, or Firm* — John Gillis

(57) ABSTRACT

A system and method for noninvasive sleep monitoring are disclosed. The system includes an in-ear biosensor system ("biosensor system") and a data analysis system. The biosensor system includes at least one earbud placed at or within an ear canal of an individual. The earbud includes an acoustic sensor that detects biosignals including infrasonic and audible signals from the individual in the ear canal. A controller board of the biosensor system collects and forwards the biosignals to the data analysis system. The data analysis system analyzes the biosignals to identify and monitor physiological information of the individual during sleep. The physiological information includes sleep stages, sleeping position information, sleep events including snore, breathing cessation and bruxism events, and sleep disorders, in examples. The system can also induce changes to the physiological information during sleep using external stimuli to improve a quality of sleep.

17 Claims, 16 Drawing Sheets

(52) U.S. Cl.
CPC .......... *A61B 5/4836* (2013.01); *A61B 5/6817* (2013.01); *A61B 5/7267* (2013.01); *A61B 5/7282* (2013.01)

(56) References Cited

U.S. PATENT DOCUMENTS

| | | | |
|---|---|---|---|
| 2013/0144190 A1* | 6/2013 | Bruce | A61B 5/7282 600/586 |
| 2019/0070386 A1* | 3/2019 | Raut | A61B 5/375 |
| 2019/0247010 A1* | 8/2019 | Barnacka | A61B 8/02 |
| 2019/0328996 A1* | 10/2019 | Lee | A61B 5/7475 |
| 2020/0397367 A1 | 12/2020 | Kinnunen et al. | |

\* cited by examiner

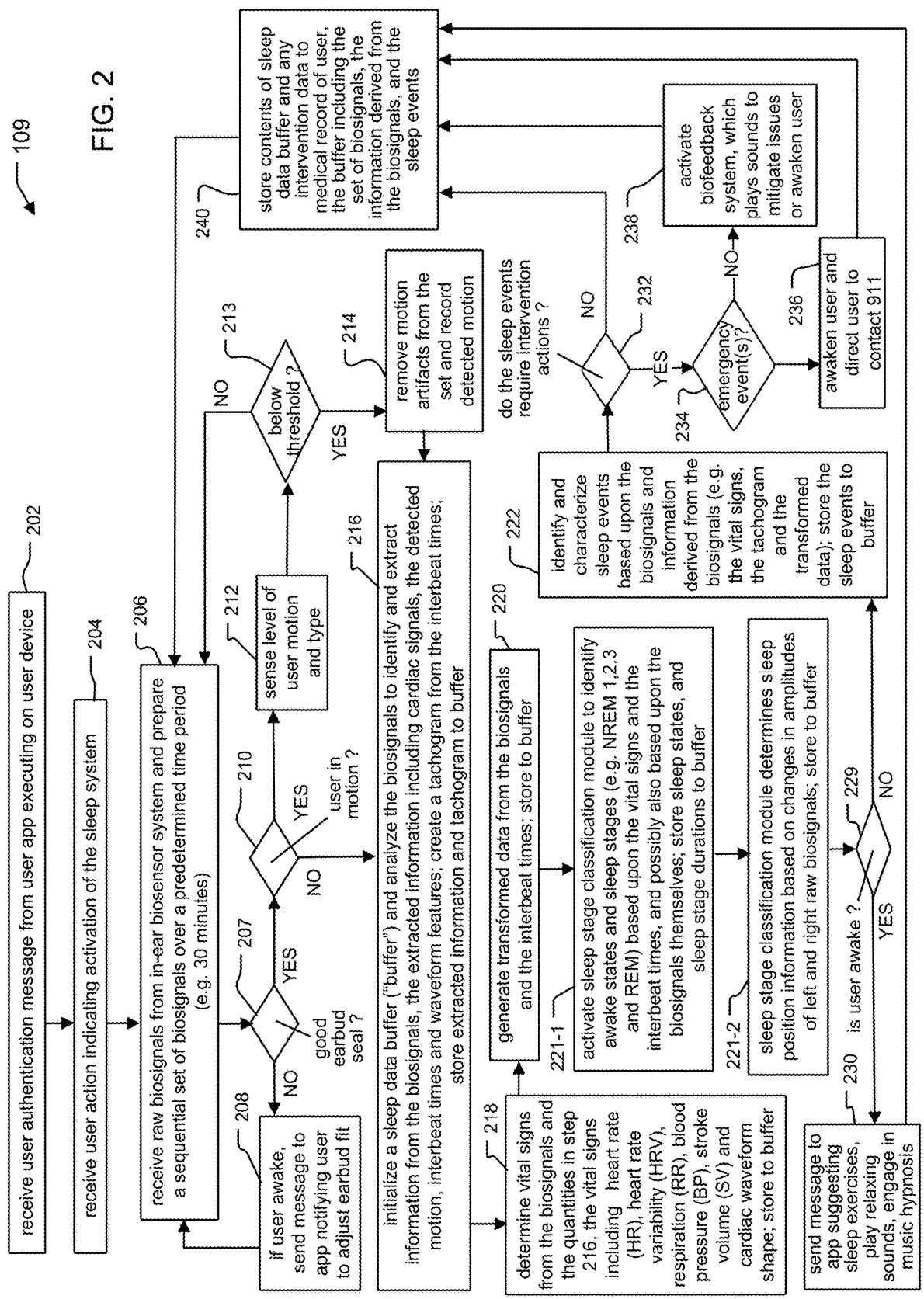

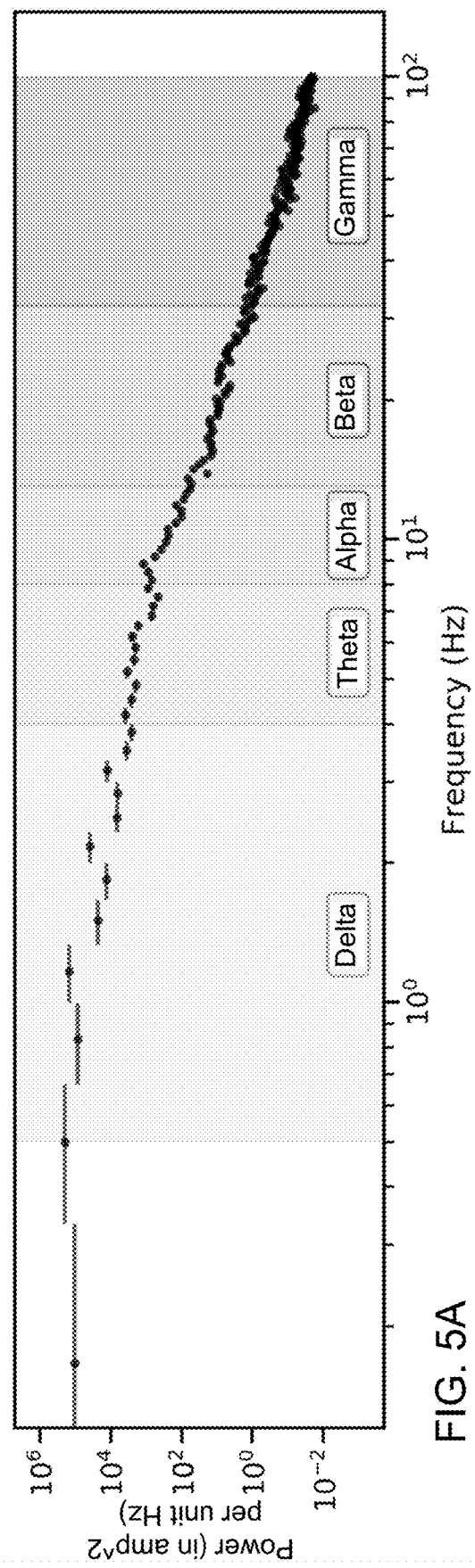
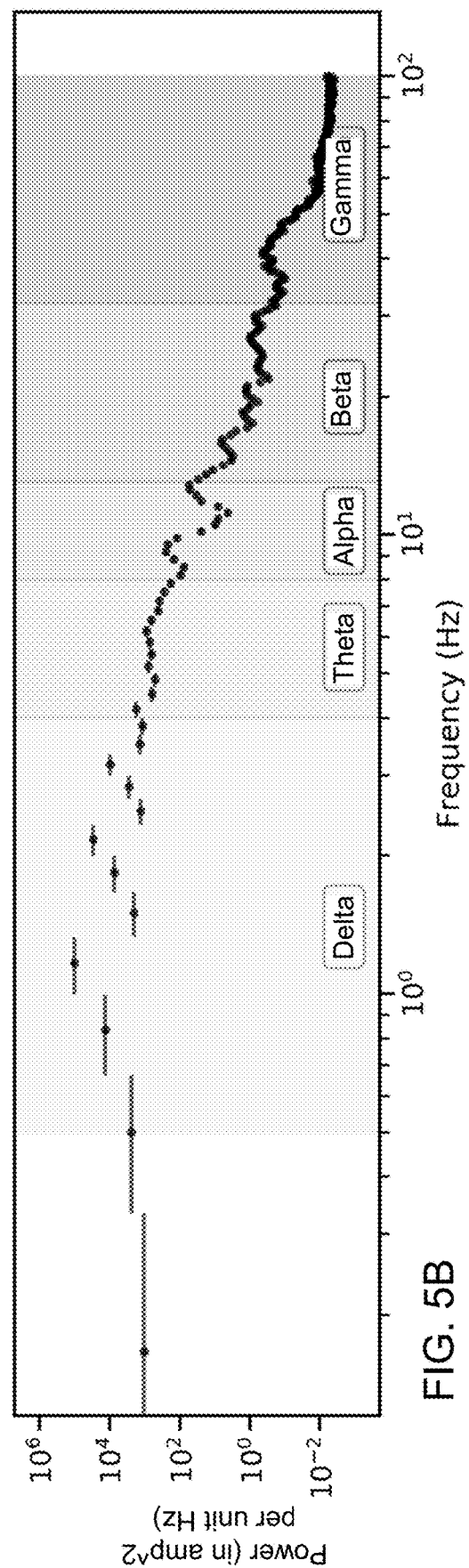
FIG. 5A
FIG. 5B

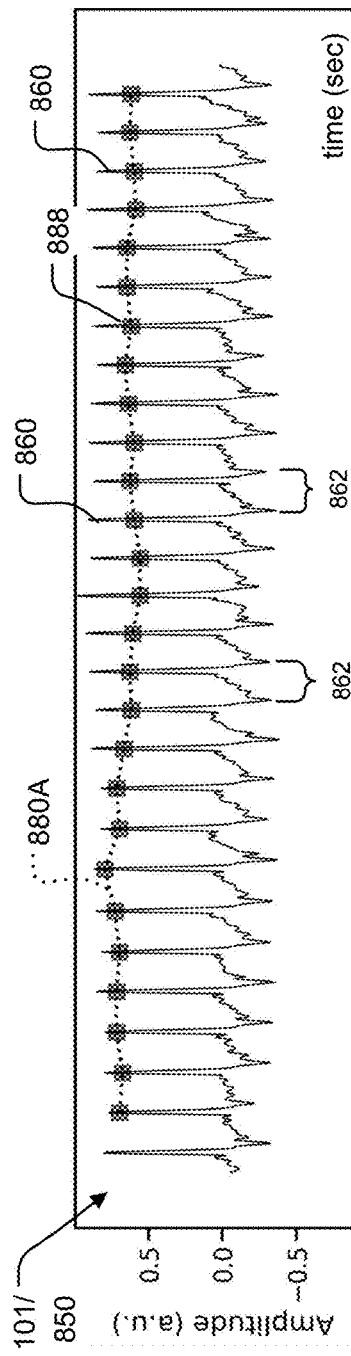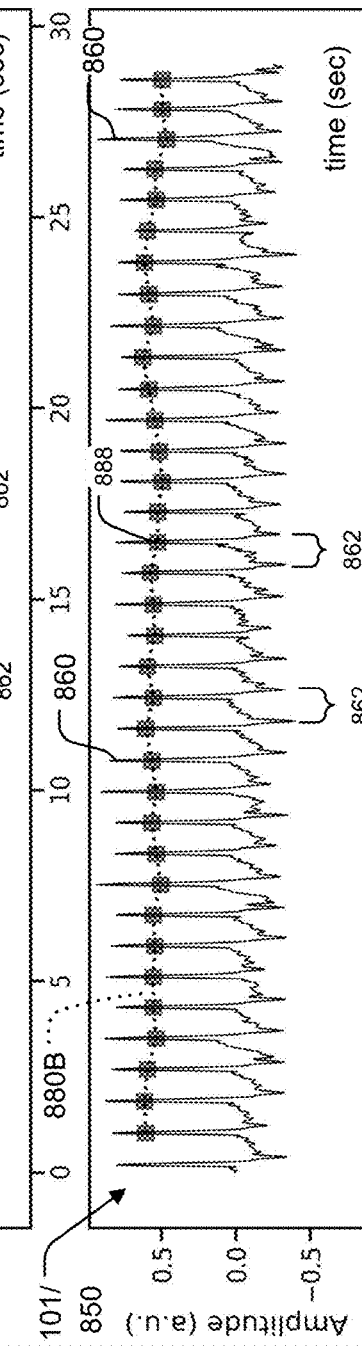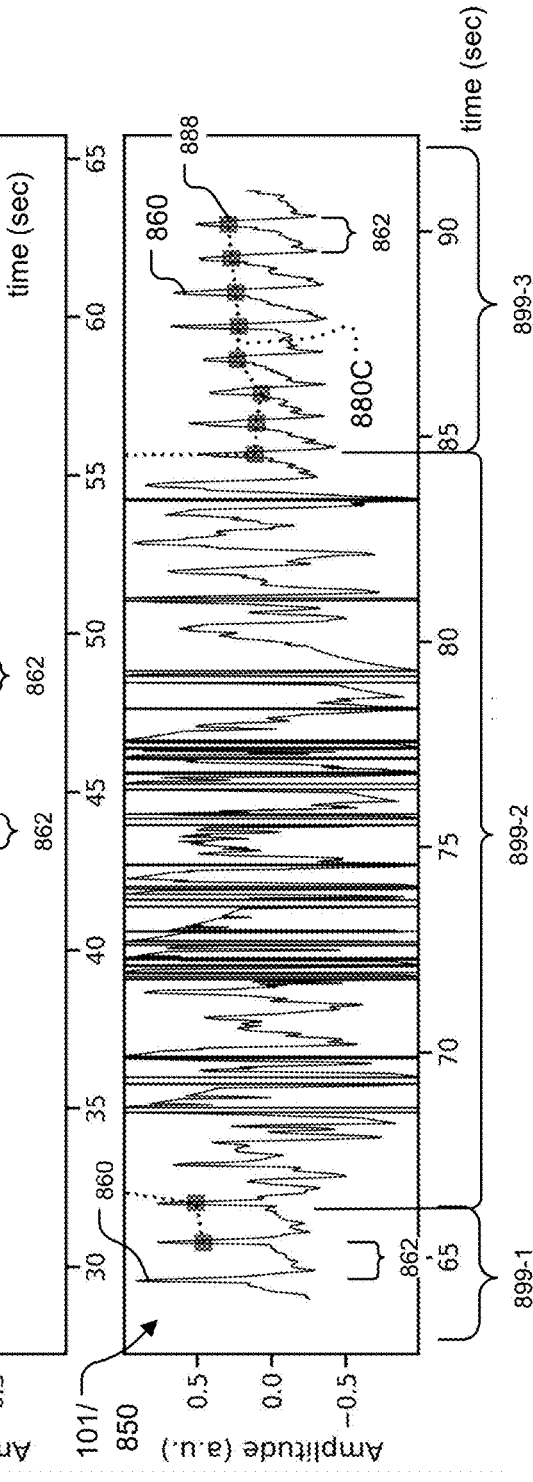

SYSTEM AND METHOD FOR NONINVASIVE SLEEP MONITORING AND REPORTING

RELATED APPLICATIONS

This application claims the benefit under 35 USC 119(e) of U.S. Provisional Application No. 63/137,040 filed on Jan. 13, 2021, which is incorporated herein by reference in its entirety.

This application is related to:

U.S. application Ser. No. 16/274,873, filed on Feb. 13, 2019, entitled "INFRASOUND BIOSENSOR SYSTEM AND METHOD," now U.S. Patent Publication No. 2019/0247010A1; and International Application number PCT/US2019/017832, entitled "INFRASOUND BIOSENSOR SYSTEM AND METHOD," now International Application Publication No. WO2019/160939A2;

All of the aforementioned applications are incorporated herein by reference in their entirety.

FIELD OF THE INVENTION

The present invention generally relates to the field of noninvasive sleep monitoring. In particular, the present invention is directed to a system and method for sleep monitoring, analysis and reporting.

BACKGROUND OF THE INVENTION

Overnight sleep study systems are currently the state of the art for monitoring sleep of individuals in the field of nocturnal polysomnography (PSG). These systems are installed at a sleep lab, are attended by a registered sleep technician, and use multiple types of sensors worn by the individuals during the sleep study. The sensors include electrical sensors placed on the skin of the individual, breathing sensors placed in the individual's nostrils or over the nose and mouth, and other sensors worn on the individual's wrist and/or fingers. Because the overnight sleep study systems are the primary tool in the PSG field, these systems are often referred to as PSG systems.

Medical professionals use the PSG systems to diagnose various sleep disorders of individuals. For this purpose, the sensors of the PSG systems detect various signals from and physical phenomena of the individual's body over a period of hours while the individual is sleeping. The PSG systems collect, store, and analyze the signals/information associated with the detected signals to identify and track sleep stages of the individual and to determine and diagnose a range of sleep disorders. The sleep stages include awake, rapid eye movement (REM) and non-rapid eye movement (NREM). The sleep disorders include insomnia, sleep apnea, narcolepsy, circadian rhythm disorders, parasomnia, and sleep stage disorders including rapid eye movement (REM) sleep stage disorders and restless leg syndrome, in examples.

The electrical sensors are the primary sensors in the PSG systems and have different types. Each electrical sensor is placed upon the skin of the individual at a specific location of the individual's body to detect electrical signals at each location. The electrical sensor types include electrocardiogram (EKG), electroencephalogram (EEG), Electrooculography (EOG) and Electromyography (EMG) sensors.

Each of the sensors are placed at various locations of the body and the signals they detect provide different information. In more detail, multiple EKG sensors are placed on the individual's chest near the heart and at pressure points of the individual's arms and legs to detect electrical signals generated by the heart and other vessels of the circulatory system. The PSG systems then analyze the signals to measure heart rhythm and heart rate. Multiple EEG sensors are attached to the scalp at the top, back, and front and detect electrical signals generated by the individual's brain. The PSG systems analyze these signals to identify if the individual is either awake or asleep and to identify different stages of sleep. At least two EOG sensors are each placed on the outer edge of each eye to detect electrical eye movement activity. The PSG systems correlate the eye movement detected by the EOG sensors with the signals detected from the EEG sensors to help identify sleep onset and to identify REM stage sleep, in examples. Finally, multiple EMG sensors may be placed near the individual's chin, arms and legs to detect electrical signals generated by the individual's muscles. The PSG systems analyze these signals to identify a lack of muscle tone near the chin that is associated with REM sleep stage disorders and to identify restless leg syndrome, in examples.

The breathing sensors are typically nasal pressure cannulae placed in the nostrils but can also be face masks placed over the nose and mouth of the individual. These sensors detect respiratory airflow signals, which the PSG systems analyze to determine respiratory issues during sleep.

The other sensors in the PSG systems include photoplethysmography (PPG) sensors and possibly piezoelectric sensors. The PPG sensors are typically infrared sensors that are placed around a finger of the individual. The PPG sensors optically detect changes in light absorption at the individual's skin that are associated with blood pressure changes and oxygen saturation. The piezoelectric sensors are typically thin-film pressure transducers that typically attach to the individual's wrist and can detect the individual's arterial pulse wave.

The PSG systems have limitations. They are intrusive, require an overnight stay and observation at a clinic or dedicated sleep lab, and require trained sleep technician attendants to attach the sensors to the individual and operate the system. Typically, as many as 22 or more electrical sensors with wires must be placed on specific locations of the individual's body. The wires restrict the ability for the individual to rest comfortably or adjust position during sleep. Because the PSG systems require an overnight stay at a dedicated sleep lab attended by one or more sleep technicians, and are designed to collect, store, and analyze information obtained from the various sensors over the duration of the sleep study, the PSG systems can also be expensive.

SUMMARY OF THE INVENTION

Biosignals are signals in living beings such as human individuals that can be detected, observed and/or measured. Examples of biosignals from individuals include acoustic signals, pressure signals, thermal signals and electrical signals, to name a few. The acoustic signals are created as a result of breathing and physical/mechanical operations within the individual's body. These operations include blood flow throughout the cardiovascular system, and opening and closing of valves within the heart and the blood vessels, in examples. These acoustic signals can be in either the infrasonic range (infrasonic signals) or in the audible range (audible signals) or both. The pressure signals are created by pressure or tension within the body. The thermal signals are created in response to physical and biochemical processes within the body. The electrical signals are associated with changes in electrical current over time, across a specialized tissue, organ, or cell system such as the nervous system.

More recently, some lower cost sleep monitoring systems have been proposed to overcome the limitations of the PSG systems. These existing sleep monitoring systems include a subset of the sensors used in the PSG systems and include a portable device that communicates with the sensors. These systems are designed for individuals to perform unattended in-home sleep monitoring. For this reason, these systems are often referred to as in-home sleep monitoring systems.

These existing in-home sleep monitoring systems are typically arranged as follows. A PPG sensor and possibly one or more electrical sensors are placed at the skin of the individuals near pressure points. The sensors may be separately attached to the skin or incorporated within a wristband, headband or ring, in examples. The sensors are either wired to the portable device or are in wireless communication with the portable device. The portable device can be a wired control panel worn by the person or a wireless smart phone located near the person that receives and collects information from the sensors over time. When the portable device is the wired control panel, a nasal cannula sensor placed in the individual's nostrils and connected to the panel monitors the individual's breathing.

The existing in-home sleep monitoring systems have limitations. In general, all are less accurate than the PSG systems. Most do not detect sleep apnea. Some claim the ability to detect only sleep apnea disorders, while others claim only the ability to improve sleep and reduce insomnia. The wrist-worn and headband devices of some systems and the systems that rely upon a separate wired controller worn by the individual can also be uncomfortable. In addition, some of the existing in-home systems claim the ability to improve sleep, but do so by offering suggestions or providing information to the individual only after the individual is awake. Such a capability is also known as open loop sleep monitoring. Finally, users have reported that the existing in-home systems can be unreliable and have a high rate of false positive readings. The false positive readings are associated with health conditions including abnormal heart rhythms and sleep apnea, in examples. This has led to unnecessary visits to doctors and other health professionals and limited adoption and usage of the existing in-home sleep monitoring systems.

It is therefore an object of the present invention to provide a non-invasive sleep monitoring, analysis and reporting system ("sleep system") that can detect physiological information of individuals during sleep. The physiological information includes physiological conditions and behaviors of the individual. This information includes cardiovascular system operation, breathing, movement of the individual, sleep stages, sleep events and sleep disorders, in examples.

The proposed sleep system eliminates the invasive wiring of the PSG systems while also providing substantially similar detection and analysis capabilities as that provided by the various sensors of the PSG systems. The proposed system determines whether the individual is awake or asleep, identifies and classifies sleep stages during sleep, and records the time spent in each stage. The system also identifies, classifies and records sleep events during sleep and the time spent in each sleep event. The sleep events include snore events, breathing cessation events and bruxism events, in examples. The proposed system can also identify and track sleeping positions of the individual.

The proposed system can also detect various sleep disorders using the sleep events. In one example, the system can detect sleep apnea by correlating abnormal snore events with breathing cessation events over the same time periods. In other examples, the proposed system can detect insomnia, periodic limb movement disorder and restless leg syndrome.

In one embodiment, the in-ear biosensor system sends the detected signals over wireless links (e.g., cellular, WiFi) to a user device such as a smartphone, which in turn wirelessly forwards the detected biosignals for processing to a data analysis system. In one implementation, the in-ear biosensor system can instead send the detected signals directly to the remote data analysis system over a high-speed cellular link without having the user device as an intermediary.

In another embodiment, the data analysis system is located on a network that is remote to the individual's home/home network. The data analysis system might be distributed across one or more processing nodes in the remote network. The remote network can be a public or private cloud network such as Amazon Web Services (AWS), Microsoft Cloud Services, IBM Cloud Services, Oracle Cloud Infrastructure, or other public or private cloud service.

In other embodiments, the proposed sleep system can analyze the detected biosignals locally. For this purpose, the data analysis system or its capabilities can be incorporated into the in-ear biosensor system, the user device or across multiple user devices. The capabilities of the data analysis system might also be distributed across the in-ear biosensor system and one or more user devices.

The proposed sleep system has additional benefits. The accuracy of the proposed system can approach that of the PSG systems. In addition, the proposed system can detect cardiovascular anomalies that are associated with various sleep disorders and instances of bruxism (i.e., teeth grinding), in examples. Moreover, because the proposed sleep system allows individuals to monitor their sleep in the comfort of their own homes, there is a significant cost savings as compared to the PSG systems.

In yet another benefit, the proposed sleep system can serve populations and geographical areas that the existing PSG systems cannot. In one example, the proposed sleep system can serve individuals that live in remote areas and rural settings where infrastructure is limited. In another example, the proposed sleep system can serve individuals who do not have access to transportation, have difficulty walking and/or traveling from their homes to a clinic, or are unable to do so because of medical conditions and/or advanced age. In still another example, the proposed system can be rapidly deployed in makeshift environments after natural disaster events and in military settings.

Additionally, the proposed sleep system has many advantages over existing in-home sleep monitoring systems. In one example, the proposed system is much more accurate. In another example, the proposed system can detect sleep events of different types and multiple sleep disorders. In yet another example, as compared to the existing in-home sleep monitoring systems that utilize wired controllers, the proposed system has fewer components and thus a lower cost. Moreover, unlike the existing in-home systems, the proposed sleep system can induce changes to the physiological information of the individual during sleep to improve the quality of sleep. This is also known as closed loop sleep monitoring. For this purpose, while the individual is sleeping, the sleep system can uses/introduce external stimuli such as white noise, soothing sounds and tones to the individual via the earbuds to improve their quality of sleep, in one example.

In general, according to one aspect, the invention features a sleep monitoring and reporting system. The system includes an in-ear biosensor system and a data analysis system. The in-ear biosensor system includes at least one earbud placed at or within an ear canal of an individual, where the at least one earbud includes an acoustic sensor that detects biosignals including infrasonic signals and audible signals from the individual in the ear canal. The data analysis system receives the biosignals from the biosensor system, determines whether the individual is awake or asleep based on the biosignals, and analyzes the biosignals to identify and monitor physiological information of the individual during sleep.

In one implementation, the data analysis system can induce changes to the physiological information using external stimuli to improve a quality of sleep of the individual. In one example, the physiological information includes sleep stages that the data analysis system detects and classifies based upon the biosignals.

Typically, the data analysis system identifies and extracts information from the biosignals including interbeat times, cardiac signals and waveform features, calculates tachograms from the interbeat times, determines vital signs from the extracted information and the tachograms, and monitors changes to the vital signs to detect and classify the sleep stages. The data analysis system also obtains frequency domain transformed data from the biosignals and the interbeat times, derives additional waveform features from the transformed data, and passes the additional waveform features along with the waveform features of the extracted information as input to one or more machine learning models to detect and classify the sleep stages.

In another example, the physiological information includes sleep events including snore events, breathing cessation events and bruxism events that the data analysis system detects and classifies based upon the biosignals. In one implementation, the data analysis system classifies the bruxism events by calculating frequency domain transformed versions of the biosignals over time periods and amplitude variability metrics of the biosignals for the same time periods, and checking the metrics and the transformed versions of the biosignals against snore models that include reference signals for known bruxism events of individuals.

In another example, the physiological information includes sleep apnea that the data analysis system detects by classifying the snore events as apneatic snore events over time periods, and determining that the breathing cessation events occur over the same time periods. In yet another example, the physiological information includes insomnia that the data analysis system detects by tracking awake and sleep states derived from the biosignals.

Additionally, the at least one earbud can include a motion detector that detects movement of the individual and the in-ear biosensor system sends the detected motion with the biosignals to the data analysis system for analysis. The data analysis system can detect motion-related sleep disorders including periodic limb movement disorder and restless leg syndrome based upon the detected motion.

In another implementation, the in-ear biosensor system includes a second earbud placed in or at a right ear canal of the individual and that includes an acoustic sensor that detects the biosignals including the infrasonic and audible signals from the individual in the right ear canal. The acoustic sensor of the second earbud sends the biosignals detected in the right ear canal to the data analysis system, and the at least one earbud is placed in or at a left ear canal of the individual. The physiological information includes position information of the individual that the data analysis system determines based on changes in amplitudes of biosignals detected in the left ear canal relative to changes in amplitudes of biosignals detected in the right ear canal.

In general, according to another aspect, the invention features a method for monitoring an individual with an in-ear biosensor system. The method detects biosignals including infrasonic signals and audible signals from the individual in an ear canal of the individual, via an acoustic sensor; and receives the detected biosignals from the acoustic sensor, determines whether the individual is awake or asleep based on the biosignals, and analyzes the biosignals to identify and monitor physiological information of the individual during sleep.

In one example, the method can induce changes to the physiological information using external stimuli to improve a quality of sleep of the individual.

The method can also detect and classify sleep stages of the physiological information based upon the biosignals. In one example, the method detects and classifies sleep stages of the physiological information based upon the biosignals by identifying and extracting information from the biosignals including interbeat times, cardiac signals and waveform features, calculating tachograms from the interbeat times, determining vital signs from the extracted information and the tachograms, and monitoring changes to the vital signs. In another example, the method detects and classifies sleep stages of the physiological information based upon the biosignals by obtaining frequency domain transformed data from the biosignals and the interbeat times, deriving additional waveform features from the transformed data, and passing the additional waveform features along with the waveform features of the extracted information as input to one or more machine learning models to detect and classify the sleep stages.

In another example, the method can detect and classify sleep events including snore events, breathing cessation events and bruxism events of the physiological information based upon the biosignals. In yet another example, the method can detect sleep apnea physiological information by classifying the snore events as apneatic snore events over time periods, and determining that the breathing cessation events occur over the same time periods. In still another example, the method can detect insomnia physiological information by tracking awake and sleep states derived from the biosignals.

In one implementation, a motion sensor included within the at least one earbud detects movement of the individual and the in-ear biosensor system, sends the detected motion with the biosignals for analysis, and detects motion-related sleep disorders including periodic limb movement disorder and restless leg syndrome based upon the detected motion.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2 is a flowchart that illustrates a method of operation of the data analysis system;

FIG. 5A-5C are exemplary power spectra plots of the vital signs in FIG. 4A-4D that the data analysis system generates in the method of FIG. 2, where FIGS. 5A, 5B and 5C show the power spectra of the vital signs during the awake, NREM, and REM sleep stages, respectively;

FIG. 8A is a plot of biosignals of a sleeping user detected by and sent from the in-ear biosensor system; and FIG. 8B shows a magnified and cardiac signal filtered version of the biosignals in FIG. 8A, where the remaining components of the magnified and filtered biosignals in FIG. 8B are snore signals associated with snore events;

FIG. 10A-10C are exemplary plots of biosignals and associated tachograms, where the biosignals are obtained by the sleep system for a sleeping individual diagnosed with obstructive sleep apnea over a 90-second time interval, and passed as input to the method of FIG. 6 and processed in detail in accordance with the method of FIG. 9, and where: FIG. 10A shows a first set of biosignals and tachogram over a 30-second period that is associated with a normal breathing event; FIG. 10B shows a second set of biosignals and tachogram over the next 35 seconds, during which the individual stops breathing; and FIG. 10C shows a third set of biosignals and tachogram over the remaining 25 seconds, during which the individual's breathing resumes;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
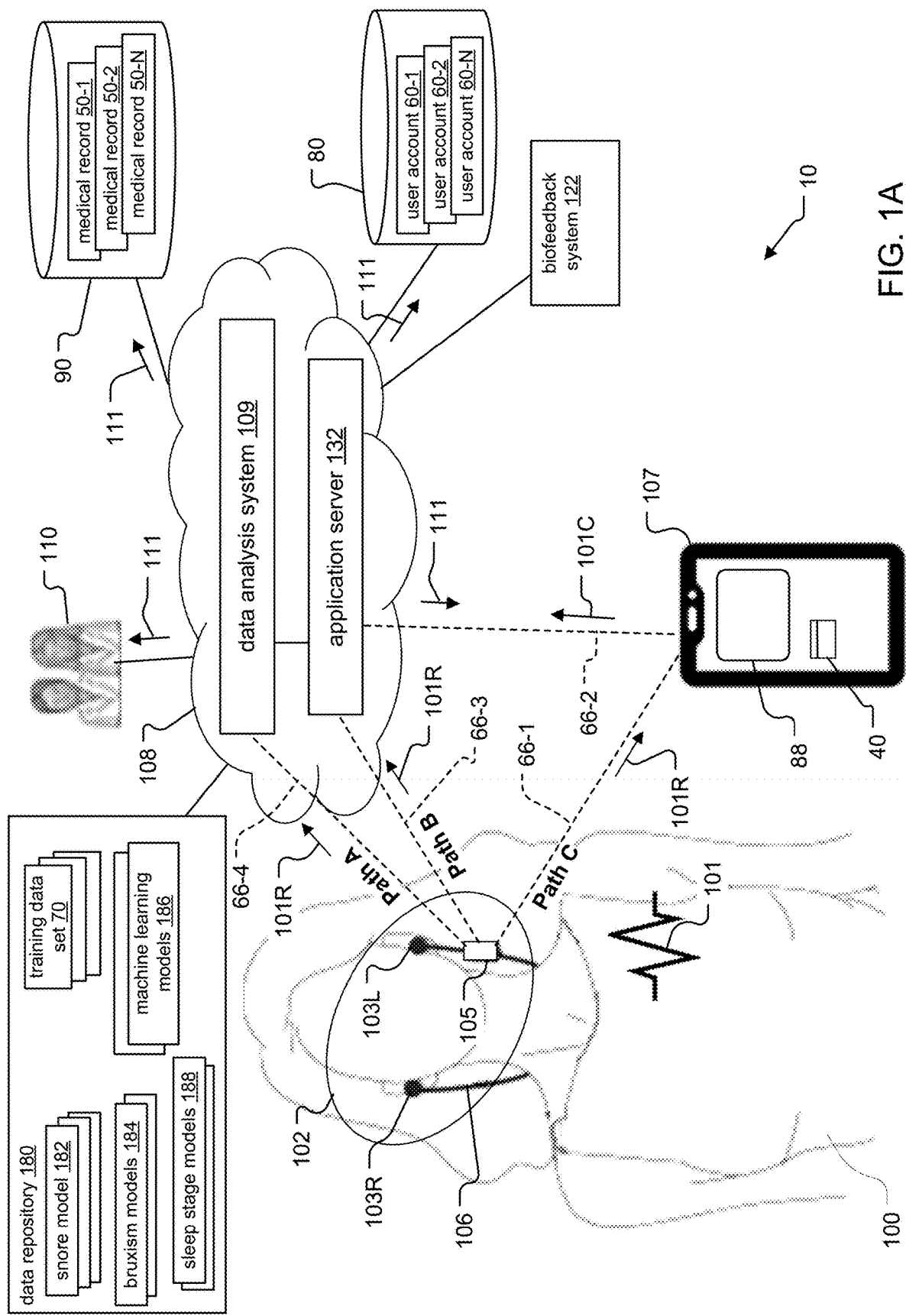
FIG. 1A is a schematic diagram of an exemplary sleep monitoring, analysis and management system ("sleep system") constructed in accordance with principles of the present invention, where the sleep system includes an in-ear biosensor system that detects biosignals from an individual and a cloud-based data analysis system that analyzes the biosignals.

FIG. 1A is a schematic diagram of an exemplary sleep monitoring, analysis and management system ("sleep system") 10 constructed in accordance with principles of the present invention. The sleep system 10 includes an in-ear biosensor system 102 worn by an individual 100, a user device 107 carried by the individual 100 and various components within and/or in communication with a network cloud 108.

The components within and/or in communication with the network cloud 108 include a data analysis system 109 and an application server 132, a medical record database 90 and a user account database 80. Additional components include a data repository 180 and a biofeedback system 122. The medical record database 90 includes medical records 50 of individuals 100, while the user account database 80 includes user accounts 60 of individuals 100 that are authorized users of the sleep system 10. The data repository 180 includes snore models 182, bruxism models 184, machine learning models 186, sleep stage models 188 and training data sets 70.

A computing device includes at least one or more central processing units (CPUs) and a memory. The CPUs have internal logic circuits that perform arithmetic operations and execute machine code instructions of applications ("application code") loaded into the memory. The instructions control and communicate with input and output devices (I/O) such as displays, printers and network interfaces.

The CPUs of the computing devices are typically configured as either microprocessors or microcontrollers. A microprocessor generally includes only the CPU in a physical fabricated package, or "chip." Computer designers must connect the CPUs to external memory and I/O to make the microprocessors operational. Microcontrollers, in contrast, typically integrate the memory and the I/O within the same chip that houses the CPU.

The CPUs of the microcontrollers and microprocessors of the computing devices execute application code that extends the capabilities of the computing devices. In the microcontrollers, the application code is typically pre-loaded into the memory before startup and cannot be changed or replaced during run-time. In contrast, the CPUs of the microprocessors are typically configured to work with an operating system that enables different applications to execute at different times during run-time.

The operating system has different functions. The operating system enables application code of different applications to be loaded and executed at run-time. Specifically, the operating system can load the application code of different applications within the memory for execution by the CPU, and schedule the execution of the application code by the CPU. In addition, the operating system provides a set of programming interfaces of the CPU to the applications, known as application programming interfaces (APIs). The APIs allow the applications to access features of the CPU while also protecting the CPU. For this reason, the operating system is said to execute "on top of" the CPU. Other examples of CPUs include Digital Signal Processors (DSPs), Application Specific Integrated Circuits (ASICs), and Field Programmable Gate Arrays (FPGAs).

The in-ear biosensor system 102 includes left and right earbuds 103L, 103R and a controller board 105. The earbuds 103 communicate with one another and with the controller board 105 via earbud connection 106. Here, the earbud connection 106 is a wired connection, but wireless connections are also supported. Here, the controller board 105 is an external component, but the controller board 105 can be also embedded in the earbuds 103L, 103R.

The user devices 107 include portable user devices and stationary user devices. In examples, the portable user devices include mobile phones, smart glasses, smart watches, and laptops, in examples. The stationary user devices include workstations and gaming systems, in examples. A mobile phone/smartphone user device 107 is shown.

Each user device 107 is a computing device that includes a display 88 and one or more applications. An interactive user application running on each user device 107, or user app 40, is shown. The user app 40 of each user device 107 executes upon a CPU of the user device 107, receives information sent by other components in the sleep system 10 and presents a graphical user interface (GUI) on the display 88. The GUI allows the individual 100 to enter information at the user app 40 and can display various information upon the display 88.

The application server 132 is a computing device that connects the biosensor system 102 and the user device 107 to the components within or at the network cloud 108. The application server 132 includes secure website software (or a secure proprietary application) that executes on the application server 132.

Medical professionals 110 are also shown. The medical professionals 110 include doctors, nurses/nurse practitioners, physician's assistants, and medical technicians, in examples. The medical professionals 110 are trained in the use of sleep monitoring systems such as the PSG systems and the sleep system 10, can diagnose sleep disorders from sleep studies and other information generated by these systems. The medical professionals use computing devices such as laptops or smartphones to securely connect to the network cloud 108. In examples, the medical professionals 110 can connect to the network cloud 108 through telehealth services, virtual sleep labs, or virtual sleep clinics, with user 100 information provided by the sleep system 10.

The medical professionals 110, the databases 80/90, the user devices 107, the data repository 180 and the biofeedback system 122 can connect to the network cloud 108 and/or components within the cloud 108 in various ways. These connections can be wired Internet-based or telephony connections, wireless cellular connections, and/or wireless Internet-based connections (e.g., Wi-Fi), in examples. In examples, the network cloud 108 can be a public network, such as the Internet, or a private network.

The in-ear biosensor system 102 and the user devices 107 communicate with each other and with the network cloud 108 via one or more wireless communications links 66. In more detail, the user device 107 connects to the in-ear biosensor system 102 via wireless link 66-1 and connects to the application server 132 via wireless link 66-2. The in-ear biosensor system 102 can also communicate with the application server 132 via wireless link 66-3 and might connect directly to the data analysis system 109 via wireless link 66-4. The wireless links 66 might be cellular-based or Internet-based (e.g., IEEE 802.11/Wi-Fi), or possibly even Bluetooth. In one example, the wireless links 66-3 and 66-4 are high-speed 5G cellular links. These links 66 are also encrypted to provide secure communications between the components that are at endpoints of the links 66.

In the illustrated example, the data analysis system 109 and the application server 132 are located in the network cloud 108. The network cloud 108 is remote to the individual 100. In this way, the application server 132 and the data analysis system 109 can service possibly thousands or more individuals 100 that are in different geographically distributed locations. Alternatively, the data analysis system 109 and/or the application server 132 might also be located on a local area network within a premises, such as a residence, commercial building or place of business of the individual 100. In one implementation, the capabilities provided by the application server 132 are incorporated into the data analysis system 109.

Infrasound

Biosignals such as acoustic signals are generated internally in the body by breathing, heartbeat, coughing, muscle movement, swallowing, chewing, body motion, sneezing and blood flow, in examples. The acoustic signals can be also generated by external sources, such as air conditioning systems, vehicle interiors, various industrial processes, etc. The acoustic signals include audible and infrasonic signals.

The acoustic signals represent fluctuating pressure changes superimposed on the normal ambient pressure of the individual's body and can be defined by their spectral frequency components. Sounds with frequencies ranging from 20 Hz to 20 kHz represent those typically heard by humans and are designated as falling within the audible range. Sounds with frequencies below the audible range (i.e., from 0 Hz to 20 Hz) are termed infrasonic or infrasound. The level of a sound is normally defined in terms of the magnitude of the pressure changes it represents. These changes can be measured and do not depend on the frequency of the sound.

The left and right earbuds 103L,103R detect the biosignals from the individual 100 via sensors included within one or more of the earbuds 103. These sensors include acoustic sensors, which can detect sounds in both the infrasonic and audible ranges, vibration sensors and pressure sensors, and possibly dedicated infrasonic sensors, in examples. The biologically-originating sound detected inside the ear canal by the earbuds 103 is mostly in the infrasound range. In particular, the infrasound and vibration sensors can detect biosignals from the individual 100 that include information associated with operation of the individual's cardiovascular system and musculoskeletal system. The lower frequency/infrasonic signal information associated with operation of the individual's cardiovascular and musculoskeletal systems are also known as cardiac signals and musculoskeletal signals, respectively.

The biosignals include signal components in the audible range as well as including the mostly infrasonic cardiac signals. The audible signals are associated with different activities of the individual 100 during sleep, including movement and positioning of the individual, snoring, breathing cessation and resumption, and grinding of teeth (i.e. bruxism), in examples. The in-ear biosensor system 102 then sends the biosignals 101 to the data analysis system 109 for analysis.

Typically, the biosignals are detected at each of the earbuds 103L,R at substantially the same times. This "stereo effect" can be utilized to identify and address artifacts, as well as improve a signal to noise ratio (SNR) of the biosignals 101 and thus provide high quality signals for subsequent characterization and analysis. In addition, differences in the biosignals between each earbud can be used to assess and monitor the positioning of the individual while sleeping.

The sleep system 10 generally operates as follows. An individual enters his/her credentials at the GUI of the user app 40, which the user device 107 sends over link 66-2 to the application server 132. The application server 132 receives the credentials and verifies that the credentials are associated with an authorized user of the sleep system 10. For this purpose, the secure website software at the application server 132 compares the received credentials to those stored within the user accounts 60 of the user account database 80. Upon finding a match, the application server 132 establishes an authenticated, secure login session over wireless connection 66-2 between the user app 40 and the application server 132 for the individual 100 as an authorized user of the sleep system 10.

The user app 40 might also determine whether the in-ear biosensor system 102 is paired to the proper authorized user. For this purpose, the user app 40 might access an identifier such as a serial number of the in-ear biosensor system 102 that the individual 100 previously entered into the user app 40. The user app 40 then queries the controller board 105 of the in-ear biosensor system 102 to obtain its identifier, and matches the obtained identifier to the locally stored identifier.

At the same time, the earbuds 103L,103R of the in-ear biosensor system 102 continuously detect and collect the biosignals 101 from the individual 100 and send the biosignals 101 to the controller board 105. Here, the biosignals are in "raw" format: they are uncompressed and may include some noise and/or motion artifacts. In another embodiment, the biosignals 101 might also be compressed, filtered, and pre-analyzed. The controller board 105 buffers the biosignals 101 for subsequent secure transmission to the data analysis system 109.

Once the application server 132 indicates to the user device 107 that the individual 100 is an authorized user, the user device 107 signals the controller board 105 to send the detected biosignals 101 to the data analysis system 109 by way of one or more communications paths. These paths are labeled Path A, B, and C in the figure. These paths respectively include zero, one, or more than one intermediary components or "hops" between the controller board 105 and the data analysis system 109. The decision of whether to send the biosignals 101 along the different paths depends on factors including the CPU speed of the components at the endpoints of the links 66, the buffer sizes of the wireless transceivers in the components that form each path, and characteristics of the wireless links 66 that form the communications paths. These characteristics include speed, level of encryption and available bandwidth, in examples. A description for each Path A, B and C follows hereinbelow.

Path C is typically the slowest communications path. This path includes wireless links 66-1 and 66-2, and includes the user device 107 and the application server 132 as intermediary components between the in-ear biosensor system 102 and the data analysis system 109. In more detail, the controller board 105 first sends raw versions of the detected biosignals over link 66-1 to the user device 107, indicated by reference 101R. The user app 40 then compresses the raw biosignals 101R into compressed versions of the biosignals 101C for transmission over link 66-2 to the application server 132. The application server 132 then decompresses and forwards the biosignals 101 to the data analysis system 209.

Path B is generally faster than Path C. Path B includes wireless link 66-3 and only one intermediary component, the application server 132, between the controller board 105 and the data analysis system 109. Because link 66-3 is a fast or high throughput link (such as a 5G cellular link), the controller board 105 can send the raw biosignals 101R over link 66-3 to the application server 132 without having to compress the signals prior to transmission. Here, the application server 132 can perform various operations on the raw biosignals 101R before forwarding the signals to the data analysis system 109 for analysis. These operations include filtering and characterization, authentication, and/or buffering of the signals.

Path A is typically the fastest path because it utilizes direct link 66-4 to the data analysis system 109. As a result, the in-ear biosensor system 102 can send the raw biosignals 101R directly to the data analysis system 109.

The data analysis system 109 then analyzes the biosignals 101 and can use information from the data repository 180 during the analysis. In examples, the data analysis system 109 can use the training data sets 70 as input to the machine learning models 186, and can access the sleep stage models 188, the snore models 182 and the bruxism models 184 when detecting and characterizing sleep architecture, snore events and bruxism events, respectively. The machine learning models 186 can also be stored on the application server 132 and uploaded by the data analysis system 109 at startup of the sleep system 10. The data analysis system 109 and/or the application server 132 can access and update the medical record 50 of the individual 100 during and in response to the analysis.

The data analysis system 109 can also send various notification messages 111 in response to the analysis of the biosignals 101. The notification messages 111 include information concerning the analysis and the results of the analysis. The messages 111 can be sent to the medical professionals 110, the databases 80/90, the user devices 107, and possibly even the controller board 105 of the in-ear biosensor system 102. The notification messages 111 can be in the form of an email, SMS/text message, phone call, database record in proprietary format or XML or CSV format, or possibly even audible speech, in examples.

The data analysis system 109 can also notify the individual 100 both during and after the analysis via the notification messages 111. In one example, the user app 40 receives the notification messages 111 and might present the notification messages 111 at the display 88, or forward the messages 111 over the wireless link 66-1 to the in-ear biosensor system 102. In another example, the messages 111 might be audible sound messages prepared by the data analysis system 109 or sent by the biofeedback system 122 to the connector board 105, for subsequent audio presentation at speakers included within the earbuds 103L, 103R.

As a result, the sleep system 10 can continuously monitor and analyze biosignals 101 including infrasound signals and audible signals detected by and sent from in-ear biosensor systems 102 worn by different individuals 100 and identify and characterize sleep events of the individuals 100 based upon the biosignals 101. The sleep system 10 can also update medical records 50 for each of the individuals 100 with the sleep events, report problems/notify medical professionals 110 of likely medical issues found during the analysis, and provide feedback to the individuals 100 during and upon completion of the analysis.

Figure 1B:
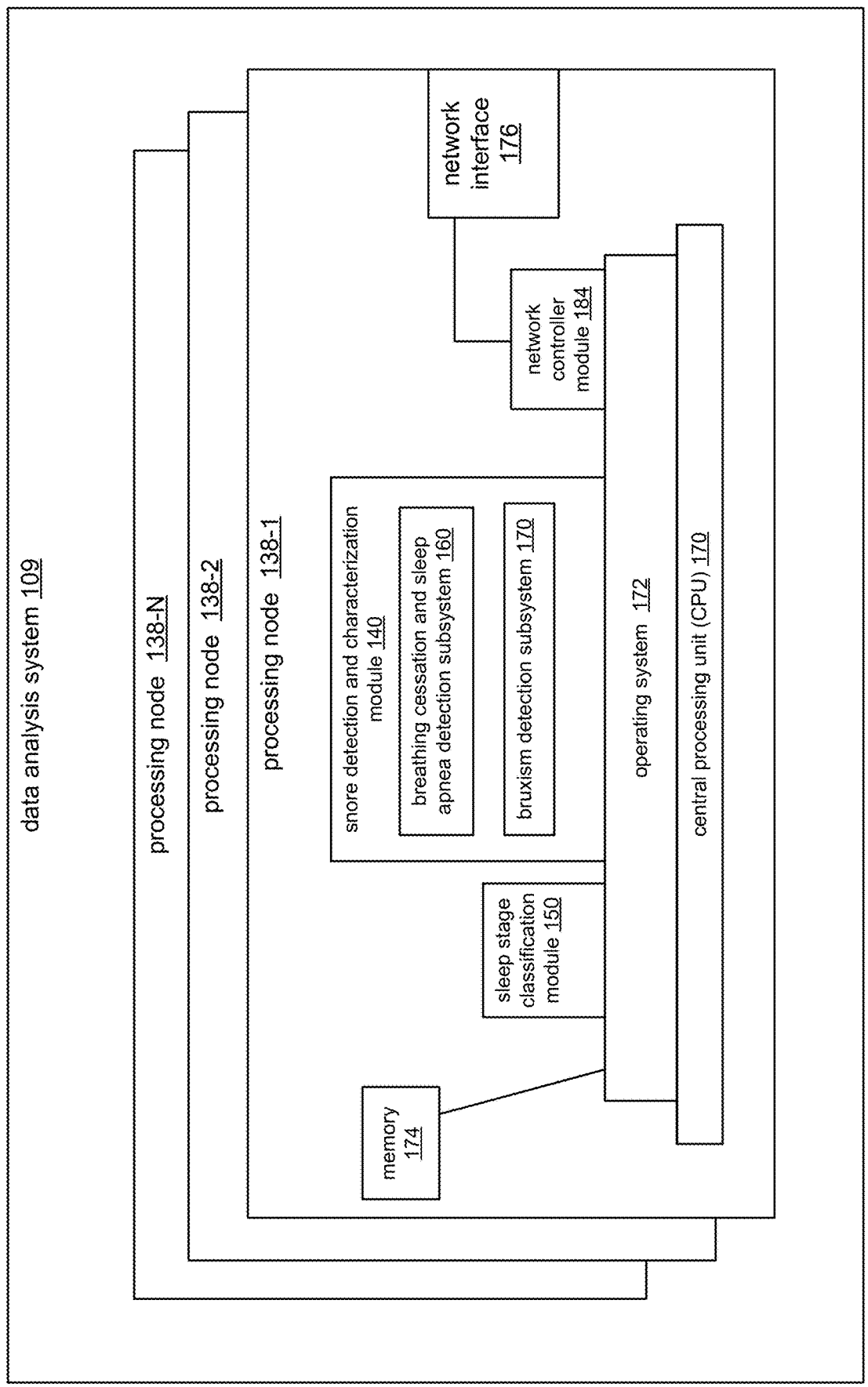
FIG. 1B is a schematic diagram that shows detail for the data analysis system in FIG. 1A.

FIG. 1B is a block diagram that shows more detail for the data analysis system 109 in FIG. 1A. Here, the data analysis system 109 includes/is formed from multiple processing nodes 138-1 through 138-N, where each processing node 138 is a computing device that is configured as a microprocessor. For example, processing node 138-1 includes a central processing unit (CPU) 170, an operating system 172, a non-volatile memory 174, a network interface 176 and various modules. The modules include a sleep stage classification module 180, a snore detection and characterization module 140 and a network controller module 184.

More detail for the modules is as follows. The snore detection and characterization module ("snore module") 140 includes subsystems. These subsystems include a breathing cessation and sleep apnea detection subsystem ("breathing cessation subsystem") 160 and a bruxism detection subsystem 170. The network interface module 184 communicates with the network interface 176. The network interface 176, in turn, connects to the application server 132 in a wired or wireless fashion.

The processing nodes 138 can be stand-alone computing systems or can be configured as individual processing elements of one or more larger computing systems. In examples, each processing node 138 can be configured as processing node 138-1, or the sleep stage classification module 150 and the snore detection and characterization module 140 could be included on different processing nodes 138. In another example, the capabilities of the modules 140, 150 are each distributed across multiple processing nodes 138. Such a flexible configuration of the processing nodes 138 and their content/capabilities allows the data analysis system 109 to be distributed across different physical locations within the network cloud 108, while also providing redundancy and fault-tolerance.

The modules can also be configured in different ways. In one example, as shown, the modules are firmware and/or software modules that sit on top of the operating system 172 and are executed by the CPU 170. In another example, the modules might be hardware-based modules such as FPGAs or custom ASICs that communicate with the CPU 170 via the operating system 172.

Figure 1C:
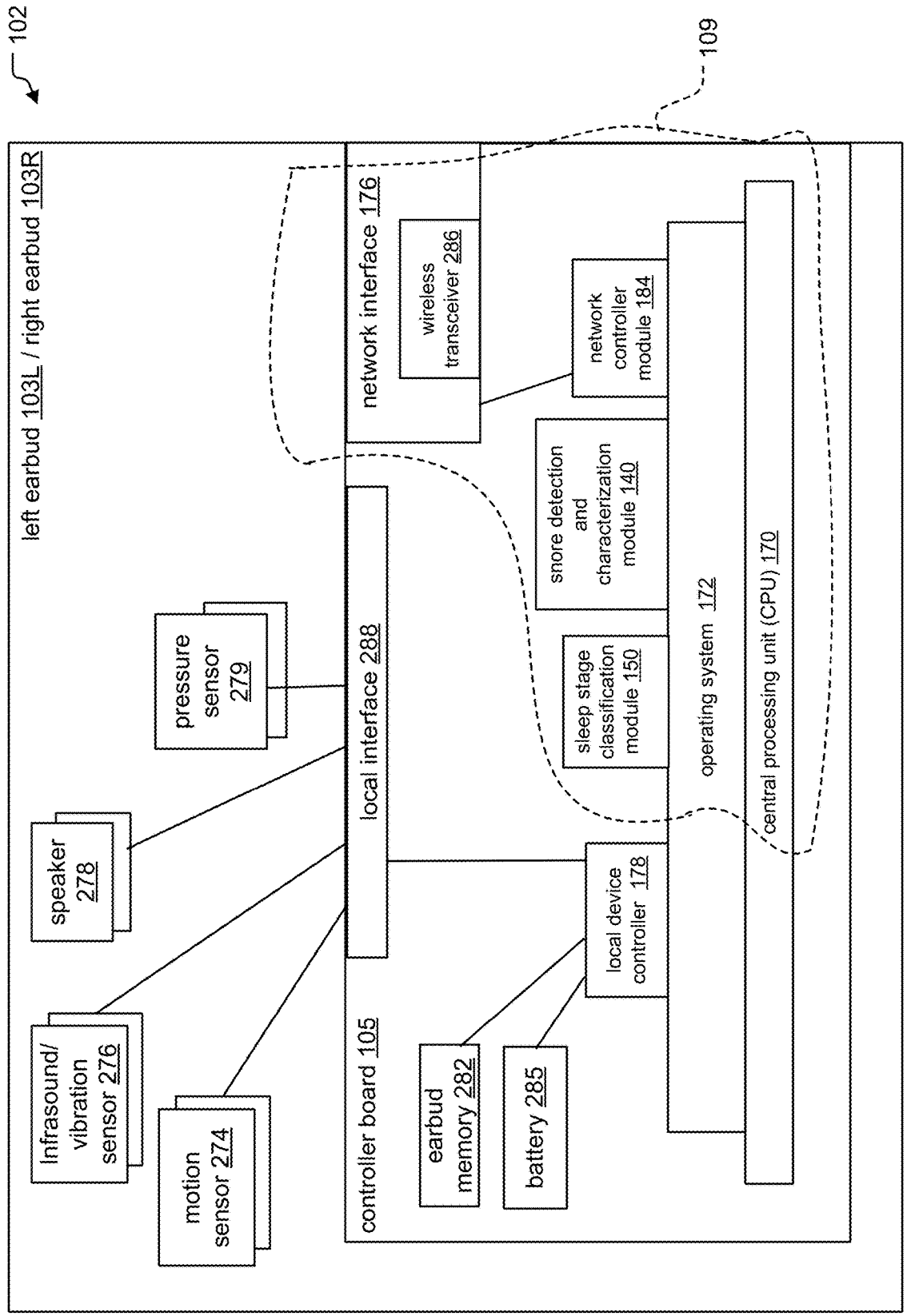
FIG. 1C is a schematic diagram showing detail for the in-ear biosensor system, according to an embodiment, where the data analysis system is incorporated into the in-ear biosensor system.

FIG. 1C shows detail for an embodiment of the in-ear biosensor system 102. In the illustrated example, both of the earbuds 103L,R are configured as microprocessors, include substantially the same components and operate in substantially the same way.

In the illustrated example, the earbuds 103 each include various sensors and a controller board 105. In more detail, the sensors in each earbud include one or more motion sensors 274, one or more acoustic sensors such as infrasound/vibration sensors 276, one or more speakers 278 and one or more pressure sensors 279. The motion sensors include accelerometers and gyroscopes, in examples. The infrasonic/vibration sensors 276 operate in the infrasonic range and might also operate in the audible range as well. In another example, two or more acoustic sensors in each earbud can detect sound in different frequency ranges (e.g., one for detecting infrasounds and the other for detecting audible sounds).

The pressure sensors 279 serve multiple purposes. In one example, the pressure sensors 279 can be used to characterize a level of seal/occlusion of each earbud 103 with respect to the individual's ear canals. In another example, the sensors 279 can be used to monitor changes in baseline pressure in the ear canal(s) due to, for example, physiological changes. These pressure sensors 279 are examples of auxiliary sensors that can detect pressure biosignals in the individual's ear to monitor occlusion level of one or both of the earbuds 103L,R and to monitor physiological changes of the individual 100.

The controller board 105 has a local interface 288 and includes earbud memory 282, a battery 285, a network interface 176, an operating system 172 and a CPU 170. The network interface 176 includes a wireless transceiver 286. The sensors 274, 276, 279 and the speakers 278 connect to the controller board 105 via the local interface 288. The controller board 105 provides power to each earbud 103 and enables communications between each earbud and external components via the network interface 176.

The controller board 105 also includes one or more modules, a local device controller 178 and a data analysis system 109. The modules include a sleep stage classification module 180, a snore detection and characterization module 140 and a network controller module 184. The local device controller 184 and the modules sit on top of the operating system 172 and execute on the CPU 170. The data analysis system 109 is formed from the modules 140,150,184, the network interface 176, the operating system 172 and the CPU 170.

The sensors 274, 276, 279 detect various information including sounds and vibrations, motion and pressure originating from the individual 100 and send biosignals 101 representing the information to the controller board 105. In one example, the sounds and vibrations are in the infrasonic range and are represented as cardiac signals within the biosignals 101. These infrasounds and vibrations are typically associated with operation of the individual's heart and its various chambers and valves, and can also be associated with other cardiovascular components such as the lungs, arteries, veins, coronary and portal vessels. Additionally, the sounds from the individual 100 can be in the audible frequency range. These sounds include those associated with breathing and snoring, in examples. The motion sensors 274 detect movement of the individual (e.g., moving, sneezing, eye and head movements, arm and leg movements), and represent the motion as motion artifacts within the biosignals 101. The pressure sensors 279 detect pressure within the inner ear canal and represent the pressure as pressure signals within the biosignals 101.

In one implementation, the sleep system 10 analyzes the biosignals 101 and the motion artifacts to distinguish between the different movements of the individual 100.

The controller board 105 also receives information from other components in the sleep system 10 via the network interface 176. This information includes the notification messages 111 for presentation at the earbuds 103L, 103R, and commands sent from the user app 40. In another example, the information includes updates for application code running within the CPU 170.

Each earbud 103 generally operates as follows. The sensors 274, 276, 279 detect sounds and pressure from the individual 100 and send biosignals 101 representing this information and the pressure to the local interface 288. The local device controller 178 receives the biosignals 101 motion, via the local interface 288 and forwards the signals via the operating system 172 and the CPU 170 for processing by the various modules 140, 150.

In another implementation, only one of the earbuds 103 such as the right earbud 103R is configured as shown, while the other earbud 103L includes substantially similar components but does not include the sleep stage classification module 150 and the snore detection and characterization module 140. The left earbud 103L then sends the detected signals from its sensors 274, 276, 279 via its network interface 176 and wireless transceiver 286 to the right earbud 103R for processing and analysis.

In yet another implementation, only one of the earbuds such as the left earbud 103L is configured as shown, while the other earbud (the right earbud 103R) does not include a controller board 105. Here, the right earbud 103R includes only the sensors 274, 276, 279 and the speaker 278 and has a wired earbud connection 106 to the left earbud 103L. The right earbud 103R receives its source of power over the wired earbud connection 106 from the left earbud 103L, and sends its detected signals over the wired earbud connection 106 to the left earbud 103R for processing and analysis.

In still another implementation, neither of the earbuds 103L,R include a controller board 105. Instead, both of the earbuds 103L,R include only the sensors 274, 276, 279 and the speaker 278. The earbuds 103L,R connect to a common controller board 105 located along a wired earbud connection 106 between the earbuds 103, and each receive a source of power from the controller board 105. The sensors 274, 276, 279 of each earbud 103L,R send their detected signals over the wired earbud connection 106 to the controller board 105 and its data analysis system 109 for processing and analysis.

FIG. 2 is a flowchart that illustrates a method of operation of the data analysis system 109. The method starts at step 202. In the steps below, "the method" is a shorthand for operations performed by the data analysis system 109.

The data analysis system 109 determines sleep-related information of individuals 100 based upon the biosignals 101. For this purpose, the data analysis system 109 identifies information within the biosignals 101 such as cardiac signals, musculoskeletal signals, and indicia of movement of the individual, and extracts this information. The data analysis system 109 also calculates or otherwise derives various information from the raw biosignals 101, the extracted information, or both. The calculated or derived information includes plots created from the extracted information, statistical measurements and time-domain and frequency domain measurements obtained from the raw biosignals 101 and/or the extracted information, and plots created from these measurements, in examples.

In step 202, the data analysis system 109 receives a user authentication message from the user app 40 executing on the user device 107. The message indicates that the application server 132 has determined that the individual 100 is an authorized user of the sleep system 10. According to step 204, the data analysis system 109 receives a user action indicating activation of the sleep system 10. Here, the user action might be a control signal sent by the user device 107, in response to user selection of a "start" button in the GUI of the user app 40 to initiate a sleep study of a defined duration. Alternatively, the controller board 105 can activate the sleep system 10 based on a configuration stored in memory, or based on analysis of a user activity pattern.

In step 206, the data analysis system 109 receives raw biosignals 101 from the in-ear biosensor system 102. The data analysis system 109 then prepares sets of the biosignals over a predetermined time period. The time period is typically 10 minutes or greater, such as 30 minutes or possibly even hours. In more detail, in one example, the in-ear biosensor system 102 sends the detected biosignals 101L/101R in real-time to the data analysis system 109. The data analysis system 109 buffers the signals, then starts a timer and adds the biosignals 101 to each new set until the predetermined interval expires.

In another implementation, the in-ear biosensor system 102 prepares the sets of biosignals and sends the sets of the biosignals to the data analysis system 109. For this purpose, the in-ear biosensor system 102 buffers the biosignals 101 at the controller board 105 until the predetermined interval is reached; the controller board then sends the set of biosignals to data analysis system 109.

In yet another implementation, the raw biosignals 101R/L and data from other sensors can be also buffered on the mobile device 107. The mobile device 107 can then prepare the sets of biosignals and forward them to the data analysis system 109 for processing.

In yet another implementation, the in-ear biosensor system 102 sends the detected biosignals 101L/101R in-real time to the application server 132. The server 132 buffers the biosignals, prepares the sets of biosignals, and sends each set of biosignals to the data analysis system 109.

Though the method is repeatedly invoked to process each new set of biosignals, any information obtained for each set of biosignals such as sleep states, sleep stages and sleep events over the duration of a sleep study are stored persistently. In this way, the data analysis system 109 can look back upon results obtained for prior sets of biosignals when processing each new set of biosignals 101, and store information obtained over the entire duration of the sleep study to the individual's medical record 50 upon conclusion of the sleep study.

For this purpose, in one example, the data analysis system 109 maintains metadata for each set of biosignals. In another example, the data analysis system 109 maintains persistent memory in the form of a sleep data buffer that all modules of the data analysis system 109 can access during the processing of the biosignals, or forensically after the sleep study has concluded. The data analysis system 109 then either stores the information that the data analysis system 109 identified/determined for each set of biosignals to its associated metadata, to the sleep data buffer, or possibly both.

According to step 207, the method determines whether the earbuds 103L,R have a sufficient seal within/at the user's ear canals. This is a fast and efficient way of determining whether the biosignals 101 are of a sufficient quality and/or amplitude before the data analysis system 109 commits significant memory and processing resources for analyzing the biosignals 101. For this purpose, the in-ear biosensor system 102 periodically sends signals indicating the current seal level via pressure signals within the biosignals 101, and the data analysis system 109 compares the received seal level to a threshold seal level.

If the received seal level does not meet the threshold, indicating an insufficient earbud seal, the method transitions to step 208, and the data analysis system 109 sends a message to the user app 40 if the user is awake. The message notifies the user to adjust the fit of the earbuds 103 to obtain a better seal. The method then transitions back to step 206 to receive new biosignals and prepare the next set of biosignals 101. If the seal level is sufficient or "good" in step 207, the method transitions to step 210.

In step 210, the method determines whether the user 100 is in motion based on an analysis of motion artifacts within the biosignals. If the user is determined to be in motion, the method transitions to step 212 to sense the level and type of motion; else, the method transitions to step 216.

Upon completion of step 212, the method determines whether the sensed motion is below a pre-defined motion threshold in step 213. If the motion is below the threshold, the method transitions to step 214 to remove (i.e., filter) the motion artifacts from the biosignals in the set while also recording the motion event for later use by the method, and the method transitions to step 216 to continue processing. Otherwise, processing of the current set of biosignals stops. This is because experimentation has shown that there are too many motion components in the biosignals 101 to perform accurate analysis of the biosignals 101. Here, if the user is detected to be awake, the data analysis system 109 might send a notification message 111 to the user app 40 telling the user to be more stationary/limit movement, and the method transitions back to step 206 to receive new biosignals and prepare the next set of biosignals 101.

At step 216, the method initializes a sleep data buffer and analyzes the biosignals 101 in the current set of biosignals. Here, the data analysis system 109 performs signal processing to identify and extract information from the biosignals 101. The extracted information includes cardiac signals, a time between heartbeats ("interbeat times"), and waveform features within the biosignals. The data analysis system 109 also creates a tachogram from the interbeat times, and stores the extracted information, the detected motion and the tachogram to the sleep data buffer.

The interbeat times and the tachogram for each set of biosignals 101 are generally created as follows. To identify the interbeat times, the data analysis system 109 identifies periodic ventricular contraction peaks ("VC peaks") in the cardiac signals and the timestamps of each VC peak. The interbeat times are then calculated as the differences in time between successive VC peaks (i.e., the time intervals between successive peaks). The data analysis system 109 then creates the tachogram by plotting the interbeat times as a function of the timestamps at which the interbeat times occur. In this way, the tachogram indicates the points in time when each interbeat time occurs, and provides an "at a glance" view for how the heart rate of the individual changes over time.

The tachogram also indicates the times at which the user inhales and exhales. Specifically, the peaks in the tachogram occur at substantially the same times as when the user exhales, and the troughs in the tachogram occur at substantially the same times as when the user inhales.

The method uses the sleep data buffer to hold all data used during the processing of each set of biosignals, any information derived from the biosignals 101, and any results obtained during the analysis of the biosignals and the information derived therefrom, in examples. The method stores the interbeat times and the extracted waveform features to the buffer and transitions to step 218. At step 218, the method determines vital signs of the individual 100 from the biosignals 101 and from the quantities calculated in step 216. Examples of the vital signs that the method determines include heart rate (HR), heart rate variability (HRV), respiration (RR), blood pressure (BP), stroke volume (SV) and cardiac waveform shape. Upon conclusion of step 218, the method stores the vital signs to the buffer and transitions to step 220.

In step 220, the method generates/calculates frequency domain transformed data from the biosignals and the interbeat times. The transformed data includes a spectrogram, a periodogram and power spectra, in examples. Typically, the data analysis system 109 calculates these statistical measurements for each set of biosignals 101 sent from the in-ear biosensor system 102. In more detail, the power spectra are the result of frequency domain analysis of the biosignals 101 such as performing a discrete Fourier transform (DFT) of the biosignals 101. In one example, the DFT algorithm is a fast Fourier transform (FFT). The periodograms are a collection of squared-magnitude components of the power spectra, while the spectrograms plot the result of the DFTs over time. The method then stores the tachogram and the transformed data to the buffer and transitions to step 221-1.

According to step 221-1, the data analysis system 109 activates its sleep stage classification module 150 to identify awake states and sleep stages of the individual 100 based upon the vital signs and the interbeat times determined for the current set of biosignals 101.

The sleep stages include NREM 1, NREM 2, NREM 3, and REM, in examples. Additionally or alternatively, the sleep stage classification module 150 might also identify awake states and sleep stages of the individual 100 based upon the biosignals themselves. The method stores the awake states, sleep stages and durations of the sleep stages to the sleep data buffer and transitions to step 221-2.

In step 221-2, the sleep stage classification module 150 determines sleep position information of the individual 100 based on changes in amplitudes of left and right raw biosignals 103L/103R over time, and stores the information to the sleep data buffer. For this purpose, in one example, the individual 100 is asked to lie on their back at the beginning of sleep monitoring/prior to execution of the method in FIG. 2. The sleep module 150 then tracks changes in amplitudes of the raw biosignals 101L/101R from left and right earbuds 103L/103R, respectively, over time.

In more detail, the sleep module 150 initially records a back sleep position event after the individual 100 lies on his/her back, and monitors changes in the amplitudes of the biosignals 101L/101R. The ratio between the amplitude of the raw biosignals 101L obtained from the left earbud 103L and the amplitude of the raw biosignals 101R obtained from the right earbud 103R is calculated. If for a time period, this ratio increases by an amount exceeding a threshold value, the sleep module 150 marks the time period and infers that the individual 100 has turned towards their left and onto their left side and records a left sleep position event. In a similar vein, if for a period of time, the ratio between amplitude of the raw biosignals 101R and the amplitude of the raw biosignals 101L decreases by an amount and falls below a threshold value, the sleep module 150 marks the time period and infers that the individual 100 has turned towards their right and onto their right side and records a right sleep position event.

The sleep stage classification module 150 can also calculate how much time the individual 100 spends in each sleep position. For this purpose, when the sleep module 150 records a sleep position event, the sleep module 150 initializes a timer. When the sleep module 150 detects a new (i.e., different) sleep position event, the timer is stopped, and the timer value is the time spent in the previous sleep position event. The timer is then initialized to begin calculating the time spent in the current sleep position event.

Upon conclusion of step 221-2, the sleep stage classification module 150 stores the sleep position events and their durations as sleep position information to the sleep data buffer. The method then transitions to step 229.

According to step 229, the method checks the awake state. The method transitions to step 222 if the user is asleep, or transitions to step 230 if the user is awake. In step 230, the method might send a notification message 111 to the user app 40 suggesting sleep exercises, to play relaxing sounds, or to engage in music hypnosis, in examples. The method then transitions back to step 206 to receive the next set of biosignals.

According to step 222, the method identifies and characterizes sleep events based upon the vital signs, the tachogram and the transformed data calculated from the biosignals 101 in the biosignal set, and also possibly from the biosignals 101 themselves. The sleep events can include events associated with snoring, cessation of breathing, eye movement, body motion, restless leg syndrome, cardiovascular anomaly, environmental factor and bruxism in examples. The method stores the sleep events to the sleep data buffer and transitions to step 232.

In step 232, the method determines whether the sleep events require that the sleep system 10 execute intervention actions. If the sleep events are not serious/do not pose an imminent threat to the user's health, the method transitions to step 240. Otherwise, the method transitions to step 234.

In step 234, the method determines whether the serious sleep event(s) are an emergency. If so, the method transitions to step 236. If the serious sleep event(s) do not require emergency notification, the method transitions to step 238.

At step 236, the data analysis system 109 attempts to awaken the user and directs the user to call emergency services such as telephony-based 911 services. Here, the data analysis system 109 might try to awaken the user by sending a loud tone in a notification message 111 to the user app 40 or possibly even to the speakers 278 of the earbuds 103, in examples. Additionally, in some cases, the data analysis system 109 could call 911 directly. The method then transitions to step 240.

In step 238, the method activates the biofeedback system 122. The biofeedback system 122 plays sounds to mitigate issues or awaken the user, in examples. The method then transitions to step 240.

At step 240, the method stores the contents of the sleep data buffer and any intervention data to the user's medical record 50. Because the buffer includes the set of biosignals 101, any information derived from the biosignals, and any results of the analysis such as the time-stamped sleep event(s), sleep stages and their durations, the entirety of this data is thus also stored to the medical record 50. To accomplish this, the data analysis system 109 might include this information in a notification message 111 and send the message to the application server 132. The application server 132 then accesses the user's medical record and stores the information. The data analysis system 109 might also send the notification message 111 including this information to the medical professionals 110. Upon conclusion of step 240, the method transitions back to step 206 and waits to receive new biosignals and prepare the next set of biosignals 101.

As noted hereinabove, the method can also store the information determined during the analysis of each set of biosignals to the metadata associated with each set of biosignals.

Figure 3A:
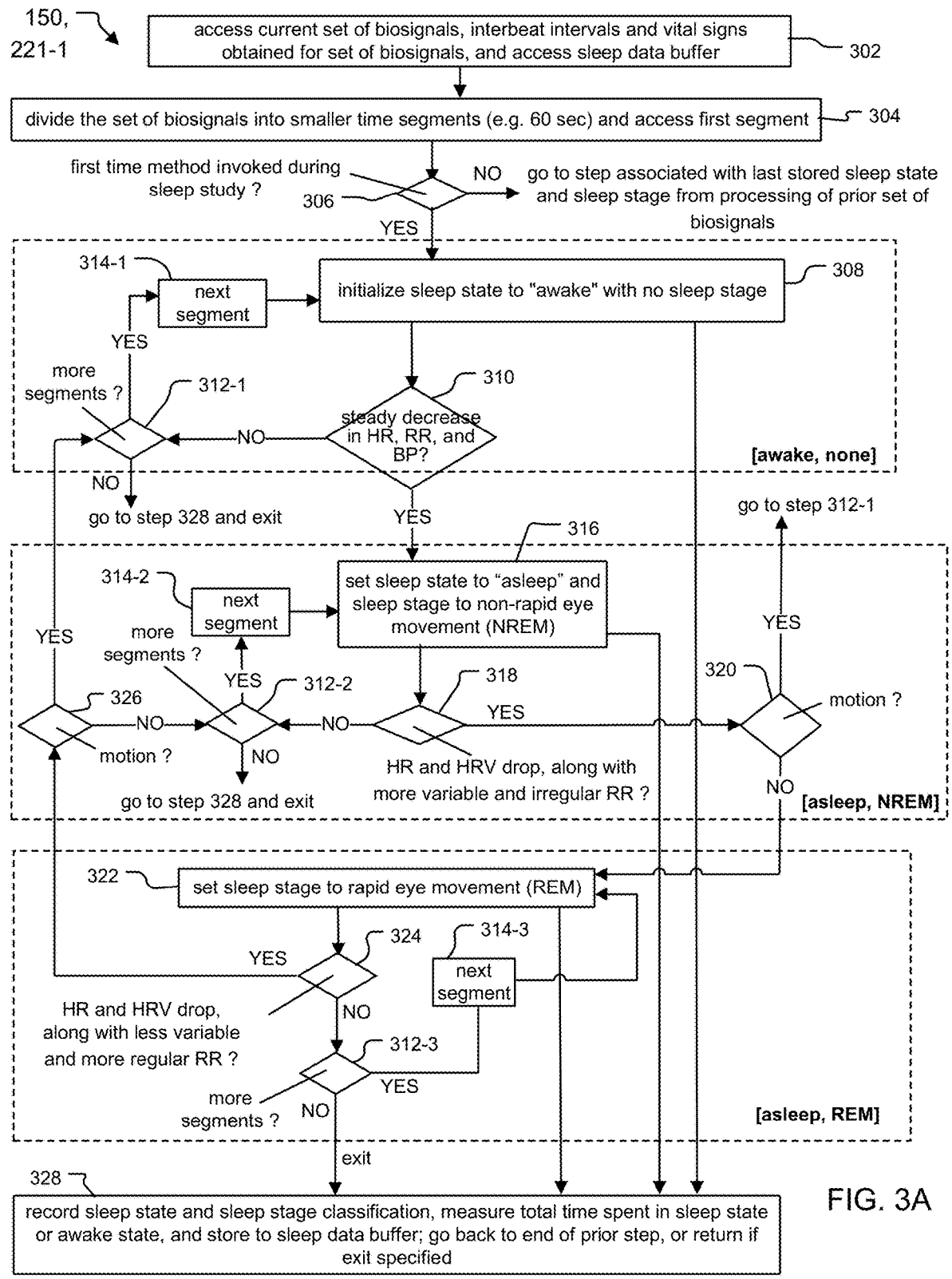
FIGS. 3A and 3B are flowcharts that provide more detail for the method of FIG. 2, where the flowcharts describe different implementations for identifying classifying sleep stages of the individual.

FIG. 3A is a method of the sleep stage classification module 150 of the data analysis system 109. The method provides more detail for step 221 in the method of FIG. 2. Specifically, the method of FIG. 3A illustrates one embodiment for how the data analysis system 109 can classify a sleep state (awake or asleep) and sleep stages (NREM and REM) of the individual 100 as an authorized user of the sleep system 10, over the entire duration of a sleep study.

In more detail, the method continuously processes each set of biosignals 101 to identify and characterize any sleep state(s) and sleep stage(s) therein, and stores the sleep states, the sleep stages, and times spent in each sleep stage to the global sleep data buffer. In one example, as shown, the method is implemented in a manner akin to a finite state machine. The sleep state and sleep stage at various steps in the method are indicated as [sleep state, sleep stage]. The method begins in step 302.

According to step 302, the sleep stage classification module 150 accesses the current set of biosignals 101, and accesses the interbeat times and vital signs data previously obtained for the set of biosignals. In step 304, the module 150 divides the set of biosignals into smaller time segments of equal length for processing. The duration of each segment is selected/configured by the operator to be a fraction of/less than the time interval over which the set of biosignals 101 were packaged/prepared. The segments are typically preconfigured by the operator of the sleep system 10 to be as small as 30 or 60 seconds in duration. In other examples, the time segments can be anywhere from 30 seconds to 60 seconds in duration, 60 seconds to 120 seconds in duration, but can also be greater than 120 seconds.

By processing the smaller segments in sequence, the sleep stage classification module 150 can identify and characterize possibly multiple sleep states and sleep stages and/or changes to sleep states and stages in each set of biosignals 101. It can be appreciated that the operator of the sleep system 10 can configure the duration of the time segments in accordance with sleep monitoring and testing objectives. These objectives might require selection of a time segment value that is the same for all individuals 100, tailored to each individual 100, groups/classes of individuals, or the like.

In step 306, the method determines if this is the first time that the method was invoked after initialization of the sleep system 10 (i.e., to process the first set of biosignals received during the sleep study). If true, the method transitions to step 308, and initializes the sleep state to "awake" with a sleep stage of none. Otherwise, the method has already processed at least one set of biosignals and stored the sleep states, sleep stages, and times of sleep stage duration determined for each prior set of biosignals. As a result, before processing the first segment of the current set of biosignals 101, the module 150 transitions to one or more of its method steps associated with the last stored sleep state and sleep stage traversed during the processing of the last segment of the prior set of biosignals 101. These one or more method steps include steps 308 and 312-1 [awake, none] and various method steps described herein below.

Upon completion of step 308, the method briefly transitions to step 328 to record the sleep state and sleep stage classification, to measure the total time spent in the sleep state or awake state, and to store these results to the sleep data buffer. The method then transitions back to the end of step 308 and onward to step 310. At step 310, the method determines whether there is a steady decrease in the vital signs HR, RR and BP for the segment. A steady decrease in these vital signs is generally associated with the individual falling asleep. If this condition is true, the method transitions to step 316 [asleep, NREM]; otherwise, the user is still awake and the method transitions to step 312-1.

In step 312-1, the method determines if there are more segments to process. If there are more segments, the method accesses the next segment in step 314-1 and returns to step 308. Otherwise, the method sets an exit flag, transitions to step 328 to record the sleep state/sleep stage/time spent in sleep stage and to update the sleep data buffer with this information, and the method exits with control passing back to the caller (the end of step 221 of FIG. 2).

In step 316 [asleep, NREM], the method sets the sleep state to "asleep" and the sleep stage to non-rapid eye movement (NREM). Upon completion of step 316, the method briefly transitions to step 328 to record the sleep state and sleep stage classification, to measure the total time spent in the sleep state or awake state, and to store these results to the sleep data buffer. The method then transitions to step 318 and checks whether the HR and the HRV vital signs "jump" (i.e., increase in amplitude) with increased variability and if irregular RR is present. If these conditions are true, the method transitions to step 320. If any of these conditions are not true, the method transitions to step 312-2 to check for more segments to process. If there are more segments, the method accesses the next segment in step 314-2 and returns to step 316. Otherwise, the method sets an exit flag, transitions to step 328 to record the sleep state/sleep stage/time spent in sleep stage and to update the sleep data buffer with this information, and the method exits with control passing back to the caller (the end of step 221 of FIG. 2).

In step 320, the method analyzes the segment to determine whether the HR and HRV jump (and irregular RR) detected in step 318 was due to the user moving. User movement detected at the NREM sleep stage generally indicates that the user has awoken. If movement is detected, the method transitions to step 312-1. Otherwise, if no motion is detected, the user has entered the REM sleep stage. For this purpose, the method transitions to step 322.

In step 322, the method sets the sleep stage to REM [asleep, REM]. Upon completion of step 322, the method briefly transitions to step 328 to record the sleep state and sleep stage classification, to measure the total time spent in the sleep state or awake state, and to store these results to the sleep data buffer. The method then transitions to step 324.

According to step 324, the method determines whether the HR and HRV vital signs of the current segment have "dropped" (i.e., decreased in amplitude) with decreased variability, and if a more regular RR is present. The decreases in these vital signs generally indicate that the user has left the REM sleep stage and transitioned back to the NREM sleep stage. When these conditions are true, the method transitions back to the NREM sleep stage in step 326, and the method checks for user motion in step 326. When these conditions are not true, the user remains in the REM state and transitions to step 312-3 to check for more segments. If there are more segments, the method accesses the next segment in step 314-3 and transitions back to step 322; otherwise, the method sets an exit flag, transitions to step 328 to record the sleep state/sleep stage/time spent in sleep stage and to update the sleep data buffer with this information, and the method exits with control passing back to the caller (the end of step 221 of FIG. 2).

In step 326, user motion detected during the NREM sleep stage most likely indicates that the user is in the process of waking up. If motion is detected in step 326, the method transitions to step 312-1 (back to awake) and checks for more segments to process; otherwise, if no motion is detected, the method transitions to step 312-2 (NREM) and checks for more segments to process.

During each of the steps that store information during processing, the module 150 also stores a reference to the segment being processed, to the sleep data buffer. As noted hereinabove, the method can also store the information determined during the analysis of each set of biosignals (and each segment within each set of biosignals) to the metadata associated with each set of biosignals.

As a result, the data analysis system 109 identifies and extracts information from the biosignals 101 including interbeat times, cardiac signals and waveform features, calculates tachograms from the interbeat times, determines vital signs from the extracted information and the tachograms, and monitors changes to the vital signs to detect and classify the sleep stages.

Figure 3B:
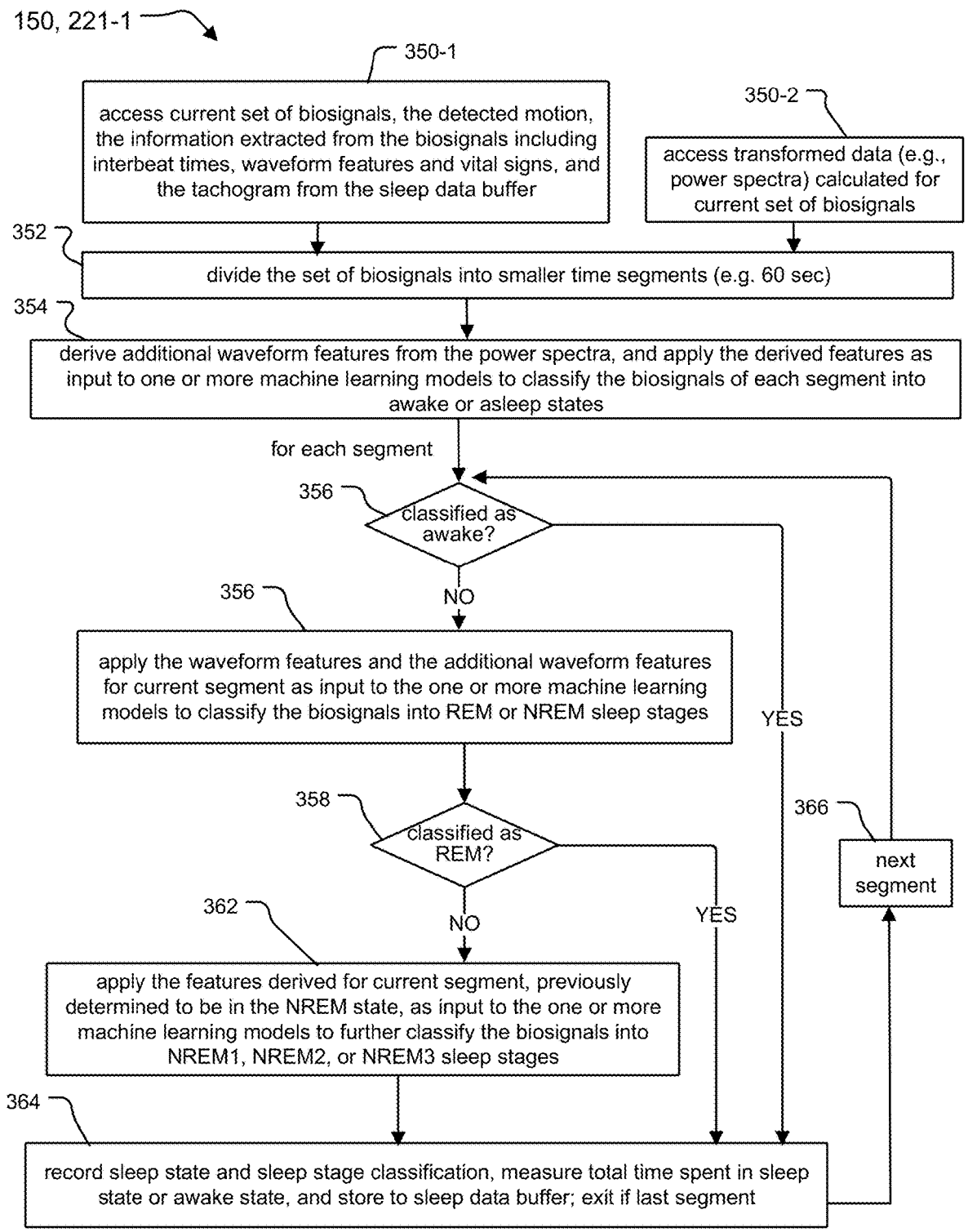

FIG. 3B is a flowchart that provides more detail for step 221 in FIG. 2 and illustrates another embodiment for how the sleep stage classification module 150 can classify an awake state and sleep stages (e.g., NREM 1,2,3 REM) of the user 100. Here, the sleep system 10 applies the raw biosignals 101 and information derived from the biosignals as input to one or more machine learning models to identify the sleep state (awake or asleep), and to identify and classify sleep stages (when the individual is determined to be asleep).

According to step 350-1, the sleep stage classification module 150 accesses the current set of biosignals, the detected motion, and the information extracted from the biosignals (e.g., interbeat times, waveform features, vital signs), the tachogram, and accesses the sleep data buffer. In step 350-2, the sleep stage classification module 150 accesses the transformed data calculated for the set of biosignals. In the illustrated example, only power spectra of the transformed data is used. The module 150 then divides the set of biosignals into smaller time segments of equal length in step 352. In the illustrated example, the duration of the time segments is 60 seconds.

At step 354, the sleep stage classification module 150 derives additional waveform features from the power spectra, and applies the derived waveform features and the additional waveform features as input to the one or more machine learning models 186 to classify the segments into awake or asleep states.

The one or more machine learning models 116 are trained before the sleep system 10 is deployed. In one example, the models 116 are trained using the training data 70 only. Another possibility is to train/retrain the model continuously (online models) in which case some combination of training data 70 and data recorded from a user 100 are used as inputs.

The training data sets 70 can include different types and combinations of information. In one example, a first training data set can include multiple anonymized sets of biosignals 101 obtained from medical records 50 of hundreds or possibly thousands of individuals 100. A second training data set might include the entire contents of the first training data set, and additionally include anonymized information that the sleep system 10 obtains from sleep studies of multiple users of the sleep system 10. The training data 70 can be manually labeled by individuals like the medical professionals 110 or can be accessed from publicly available databases.

Figure 5C:
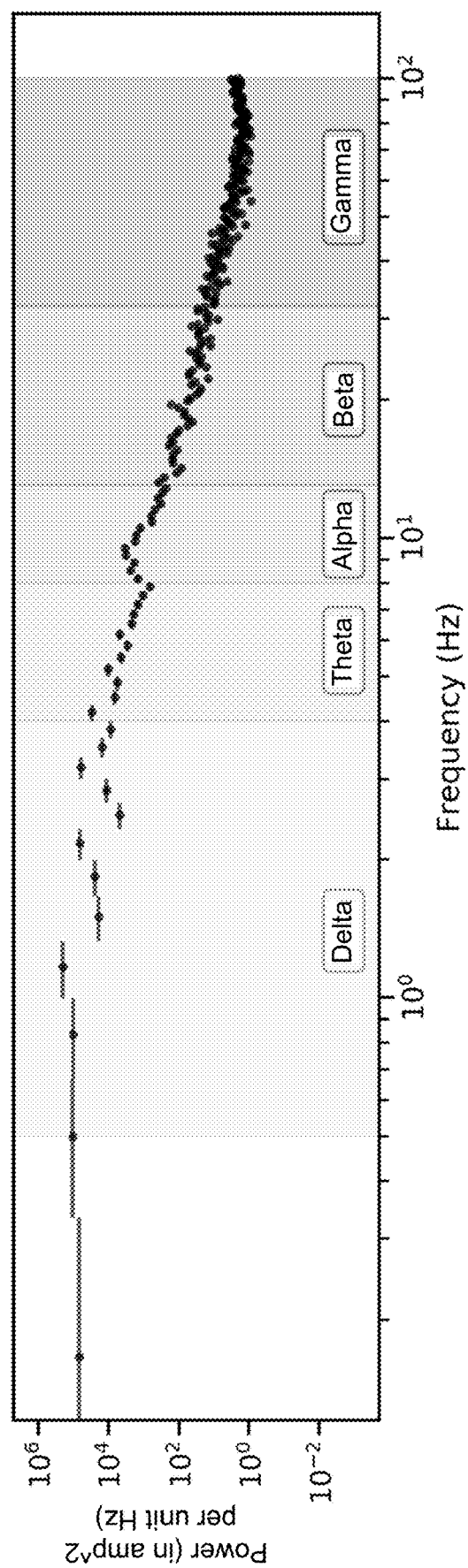

The derived features passed as input to the (trained) machine learning models 116 might include cardiac features and/or spectral features. The cardiac features can include a left ventricle ejection time (LVET), a stroke volume (SV), components of the cardiac waveform, heart contractility, and blood pressure (BP). The spectral features can include dominant frequencies with their amplitudes, ratios, integral of power in given frequency ranges. The frequency ranges may include Delta, Theta, Alpha, Beta, and Gamma frequency ranges, examples of which are shown in FIG. 5A-5C.

Different types of machine learning models can be used in the sleep system 10. In one instance, classification algorithms such as tree-based classifiers (e.g., random forest, boosted decision tree models), support vector machine, and/or neural nets are applied to features calculated from the biosignals 101. In another instance, the machine learning model includes deep learning algorithms, such as deep neural networks, convolutional neural networks, and/or recurrent neural networks either trained on the biosignals 101, or trained using transformations of the biosignals 101 such as periodograms or spectrograms.

Upon conclusion of step 354, the module 150 prepares to process each segment in an iterative fashion and transitions to step 356. In step 356, the module 150 checks whether the segment has been previously classified as awake in step 354. If awake, the method transitions to step 364; if asleep, the method transitions to step 356 to determine if the sleeping individual is in the NREM or REM sleep stage. The module repeats step 356 and the steps that follow step 356 for each segment until all segments are processed.

In step 356, the module 150 applies the features derived for the current segment as input to the one or more machine learning models 186 to classify the biosignals into REM or NREM sleep stages. The output of the one or more machine learning models 186 includes the sleep stages. According to step 358, the module 150 determines whether the segment is classified as being in the REM sleep stage. If true, the method transitions to step 364; else, the method transitions to step 362.

In step 362, the module 150 applies the features derived for the current segment, previously determined to be classified as being in/associated with the NREM sleep stage in step 358, as input to the one or more machine learning models 186 to further classify the biosignals into NREM1, NREM2, or NREM3 sleep stages. The method then transitions to step 364.

At step 364, the module 150 records the sleep state and sleep stage classification, measures the total time spent in sleep state or awake state, and stores this information to the sleep data buffer. The method then either transitions to step 366 to access the next segment and then to the beginning of step 356 to process the next segment, or exits if there are no more segments to process. Upon exiting, the method returns control to the end of step 221-1 in FIG. 2.

During each of the steps that store information during processing, the module 150 also stores a reference to the segment being processed, to the sleep data buffer. As noted hereinabove, the method can also store the information determined during the analysis of each set of biosignals (and each segment within each set of biosignals) to the metadata associated with each set of biosignals.

As a result, the data analysis system 109 obtains frequency domain transformed data from the biosignals 101 and the interbeat times, derives additional waveform features from the transformed data, and passes the additional waveform features along with the waveform features of the extracted information as input to one or more machine learning models to detect and classify the sleep stages.

FIG. 4A-4D are plots of various vital signs of an individual identified and generated by the sleep system 10 during an overnight sleep study. The plots were obtained over the same time period (here, three and a half hours) and in accordance with the method of FIG. 3A. The sleep study begins at 23:00 (11 pm) at night on a first day, and continues past 03:00 (3 am) the next day. The portion of time over which the sleep study occurs on the first day is indicated by reference 440-1, while the portion of time over which the sleep study occurs on the second day is indicated by reference 440-2.

Figure 4A:
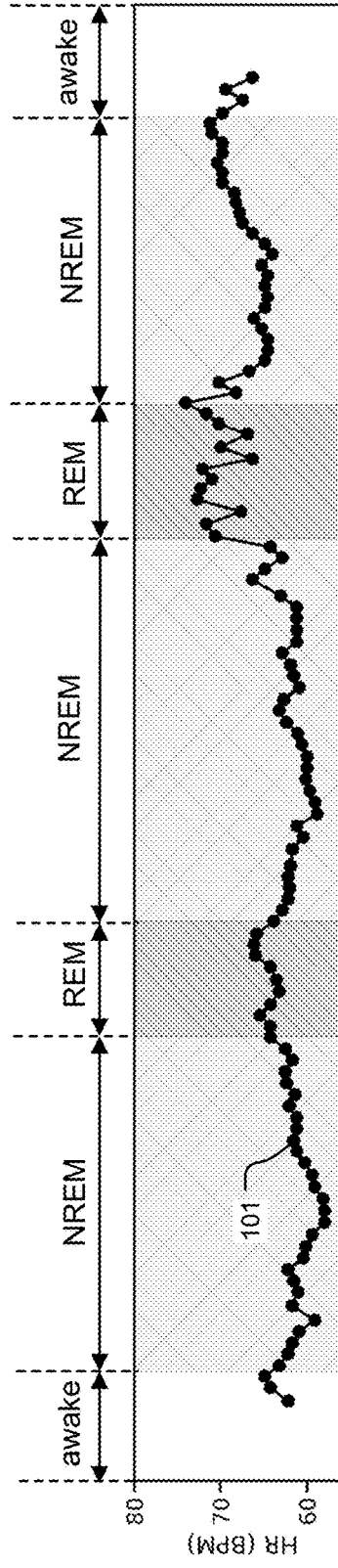
FIG. 4A-4D are exemplary plots of different vital signs of an individual that the data analysis system obtained in accordance with the method of FIG. 3A, where the vital signs were obtained over a three-and-a-half-hour period of an overnight sleep study, and where time intervals associated with awake, NREM and REM sleep stages are also shown in the plots.
Figure 4B:
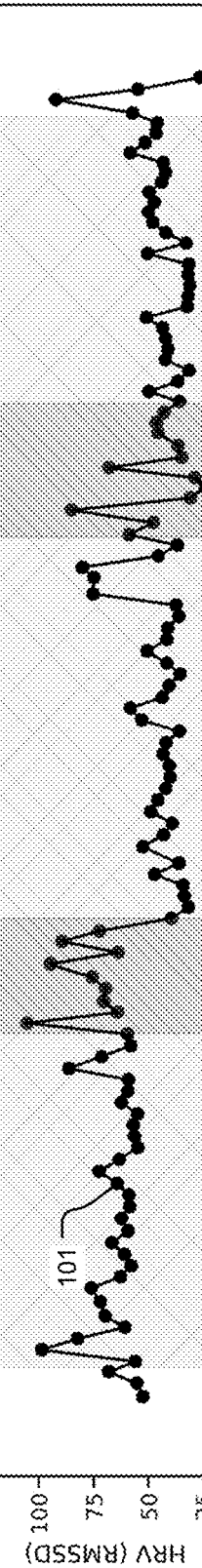
Figure 4C:
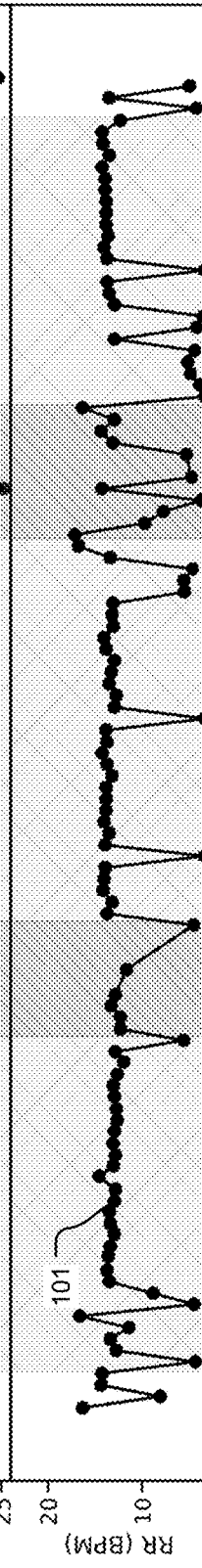
Figure 4D:
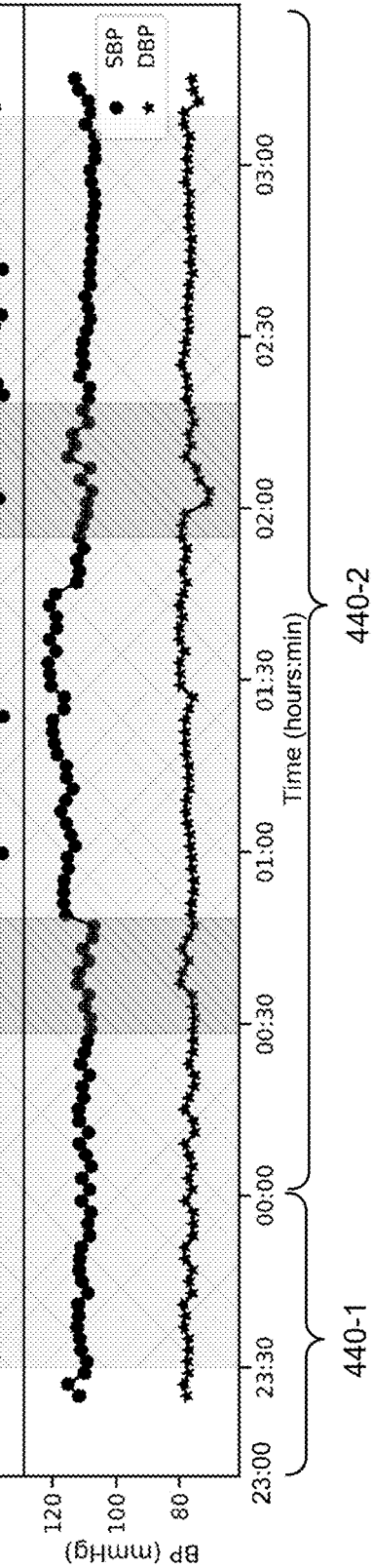

The plots are of the following vital signs of the individual: heart rate (HR), in beats per minute (BPM), in FIG. 4A; heart rate variability (HRV), expressed in units of root mean square of successive differences between normal heartbeats (RMSSD), in FIG. 4B; respiratory rate (RR), in beats per minute (BPM), in FIG. 4C; and blood pressure (BP), expressed in millimeters of mercury (mmHg), in FIG. 4D. Additionally, the information in the BP plot of FIG. 4D is further separated by the data analysis system 109 into systole blood pressure (SBP) and diastole blood pressure (DBP) components.

The data in the plots of FIG. 4A-4D are obtained in accordance with the method of operation of the data analysis system 109 in FIG. 3A. Specifically, the data analysis system 109 receives the biosignals 101 detected by and sent from the in-ear biosensor system 102, and derives the vital sign information included in each of the plots from the biosignals 101.

Multiple instances of the sleep stages (awake, NREM and REM) are indicated vertically across the vital sign plots. These sleep stages occur over different time intervals within the three and a half hour time period of the sleep study. In the illustrated example, from left to right, the awake state sleep stage is first, followed by the NREM state at approximately 23:30 (11:30 pm) of the recorded sleep study. As the individual 100 enters the NREM state, the values of the HR and RR in the plots of FIGS. 4A and 4C decrease, respectively.

After about an hour, at 00:30 (12:30 am of the next day), the individual 100 begins to transition into the REM stage of sleep. At this stage, there are substantial "jumps" (sharp increases and decreases) in the HR plot of FIG. 4A and there is higher variability followed by a drop (sharp decrease) in the HRV plot of FIG. 4B. After about 15 minutes, at around 00:45, the sleep state changes to NREM, followed by REM at around 01:55, NREM at around 02:20, and finally the individual wakes up at approximately 03:15.

FIG. 5A-5C are examples of power spectra plots of biosignals 101. The plots were generated by the data analysis system 109 during a sleep study in accordance with the method of FIG. 2. The left axis of the plots are expressed in units of amplitude squared per unit frequency (amp^2 per Hz), also known as amplitude units ("a.u.") while the right axis is expressed in frequency (Hz).

In more detail, FIGS. 5A, 5B, and 5C show the power spectra generated for successive 10-minute sets of biosignals during the awake, NREM, and REM sleep stages of the individual, respectively. The data analysis system 109 applied frequency domain analysis to the sets of biosignals to obtain the illustrated power spectra for each. The data analysis system 109 uses the power spectra in conjunction with other information derived from the biosignals 101 to identify the awake state, the sleep stages, and to identify and characterize sleep events.

FIG. 5A-5C also indicate ranges for natural oscillations (brainwaves) within the power spectra. These brain waves occur at various frequencies. Some are fast and some are slow. The classic names of these ranges of brain waves are Delta, Theta, Alpha, Beta, and Gamma and are indicated in the figures. These oscillations are traditionally detected by EEG equipment and measured in cycles per second or hertz (Hz).

More detail for the brainwaves is as follows. The Delta brainwaves (1-3 Hz) are the slowest, highest amplitude brain waves, and are what the user 100 experiences when asleep. The remaining brain waves are more dominant and are each associated with different levels of awareness. The Theta brainwaves (4-7 Hz) represent a daydream-like state that is typically associated with mental inefficiency. At very slow levels, Theta brainwave activity is associated with a very relaxed state of the user 100, representing the transition between waking and sleep. The Alpha brainwaves (8-12 Hz) are slower and larger than the Theta brainwaves. The Theta waves are associated with a state of relaxation and represent the brain transitioning into an idling state, waiting to respond when needed. The Beta brainwaves (13-38 Hz) are smaller and faster than the Alpha waves. The Beta waves are associated with a state of alertness, characterized by a light level of mental or intellectual activity and outwardly focused concentration. Finally, the Gamma brainwaves (39-42 Hz, and up to as much as 100 Hz) are the fastest and most subtle brainwaves. The Gamma brain waves are found during perception and consciousness.

Insomnia is another example of physiological information that the data analysis system 109 can detect. Insomnia is a common sleep disorder. After sleep staging analysis is performed, the data analysis system 109 detects insomnia by tracking awake and sleep states derived from the biosignals 101. In more detail, the data analysis system first quantifies the amount of time required for the individual to fall asleep once the individual is lying in bed from the biosignals. The data analysis system also quantifies the frequency and duration of awake states during the night and the time the individual's sleep is over as part of the sleep stage detection and analysis. The system 109 then tracks the total time per night that the individual spends in sleep and awake states, and compares the total times per night against both normal time ranges and insomnia ranges for the awake and sleep states.

Upon concluding that the individual is exhibiting insomnia in response to the comparison, the data analysis system can recommend actions for the individual 100 to take once awake, and/or induce changes to the individual's physiological information during sleep. In one example, the data analysis system 109 can send (or instruct a smartphone in communication with the in-ear biosensor for system 102 to send) soothing tones or music to the earbuds. In this example, the use of soothing tones and music is an attempt to change the sleep stage of the individual to REM.

The data analysis system 109 can also detect sleep disorders associated with movement including periodic limb movement disorder ("PLMD") and restless leg syndrome ("RLS"). PLMD involves repetitive movement of the arms and/or legs, where the movement occurs most often during sleep and is involuntary. In contrast, restless leg syndrome RLS involves intermittent movement of the legs, especially when the individual is tired, resting or beginning to fall asleep. The leg movements with RLS are voluntary, but the individual has an almost uncontrollable urge to move their legs, based on discomfort or pain that presents in the legs.

The data analysis system 109 can detect PLMD and RLS as follows. Because the motion sensor 274 within each earbud is sensitive to body motions, each sensor 274 can monitor and detect motion associated with limb movements. The data analysis system 109 stores the detected motion during the processing of each set of biosignals as described in the method of FIG. 2 hereinabove. The data analysis system 109 can quantify the arm and leg movements during sleep and compare the movements to those included in normal and abnormal sleep models or patterns. In response to the comparison, the data analysis system 109 can identify the severity of the PLMD and RLS conditions, whether the conditions are disrupting sleep, and notify the individual to seek medical intervention in response, in examples.

As noted hereinabove, the system plays stimuli through the speakers in the earbuds during sleep to aid the individual falling or to influence the individual's sleep. The stimuli played can include white noise, sounds of nature, etc. The system can use stimuli to help the individual fall asleep, help the individual transition from one sleep stage to another or to wake up the individual. Furthermore, the system can track how the stimuli affect the individual and learn which stimuli produce the desired results and adapt to a given individual. This can further be used to improve the individual's sleep quality. As an example, if recovery is the goal, the system can focus on maximizing deep sleep and reducing REM.

Figure 6:
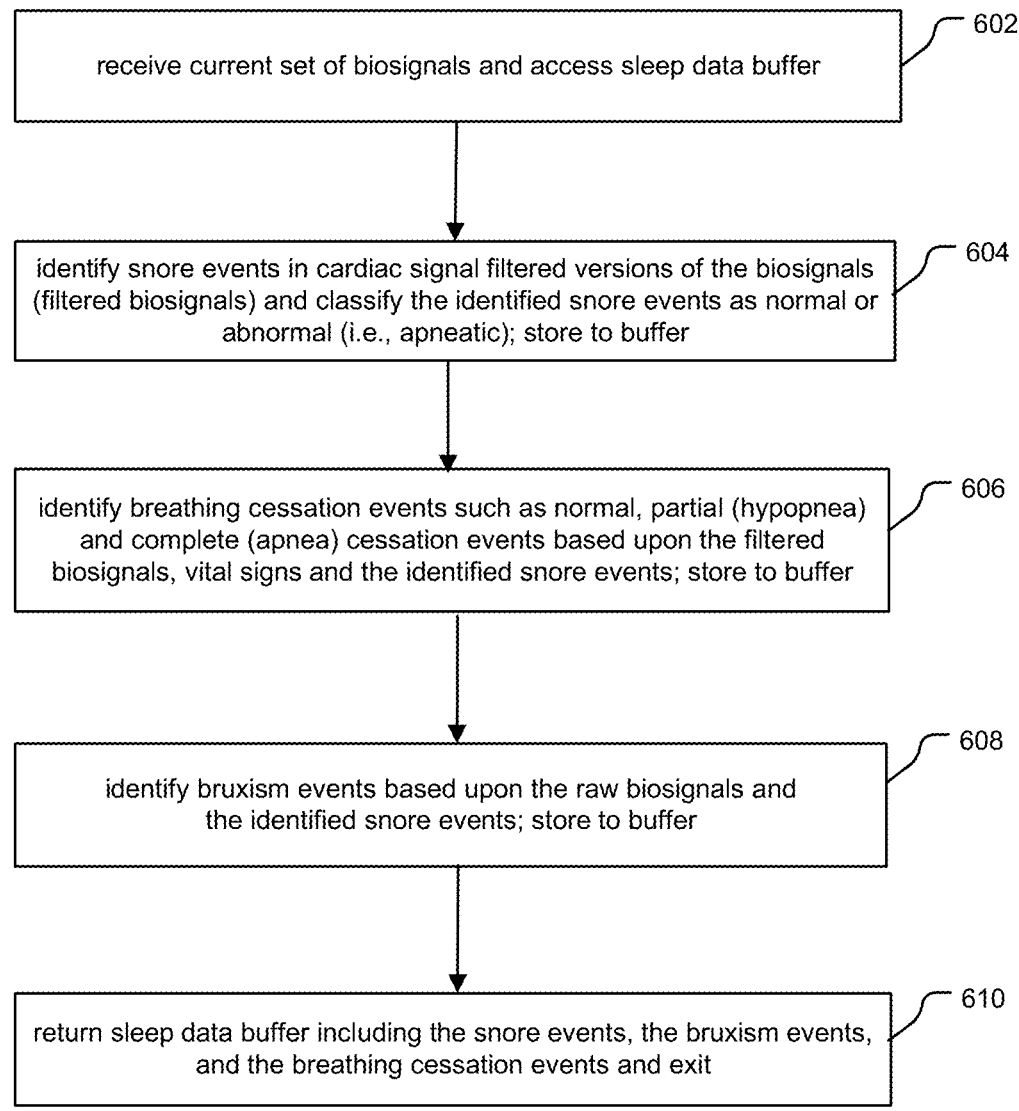
FIG. 6 is a flowchart that shows more detail for the method of FIG. 2, where the flowchart describes a method of the data analysis system for identifying and classifying sleep events based on the biosignals, and where the sleep events include snore events, breathing cessation events and bruxism events, in examples.

FIG. 6 is a flowchart that describes a method of operation of the snore module 140 of the data analysis system 109. The flowchart provides more detail for step 222 in the method of FIG. 2. Generally, FIG. 6 describes how the snore module 140 classifies the biosignals 101 into various sleep events of different types. The sleep events include snore events, breathing cessation events and bruxism events, in examples.

Snore events tend to be intermittent and short in duration. Typically, each snore event spans the duration of one or two heartbeats/interbeat times of the cardiac signals identified in the biosignals 101. Usually, snore events do not span more than 5 successive interbeat times.

Moreover, the signals associated with snore events are in the audible frequency range. While most snores occur at around 500 Hz, the fundamental snoring sound frequencies of the tonsil, tongue base, and larynx are approximately 330 Hz, 1000 Hz, and 652 Hz, respectively. See Eikendal, A. L.

et al., "Common carotid intima-media thickness relates to cardiovascular events in adults aged 45 years," Hypertension. 65, 707-713 (2015).

When the individual snores, the biosignals 101 detected by the in-ear biosensor system 102 include the higher frequency snore signals as well as the lower frequency cardiac signals. The method for the snore module 140 starts at step 602.

In step 602, the snore module 140 receives the current set of biosignals 101 and accesses the sleep data buffer. According to step 604, the snore module 140 identifies snore events in cardiac signal filtered versions of the biosignals 101 (filtered biosignals), classifies the identified snore events as normal or abnormal and stores the snore events to the buffer.

In step 606, the snore module 140 identifies breathing cessation events such as normal, partial and complete breathing cessation events based upon the filtered biosignals, vital signs and the identified snore events and stores these to the buffer. The partial breathing cessation events are also known as hypopnea while the complete cessation events are also known as apnea. The notion of partial versus complete is associated with the level of obstruction of the individual's airway during the breathing cessation event in the case of obstructive sleep apnea.

Breathing cessation events can span as few as one or two successive interbeat times, or as many as 25 or more successive interbeat times in extreme examples. The duration of each breathing cessation event and the number of breathing cessation events over a time period, such as an hour, collectively determine whether the individual's pauses in breathing are either insignificant/normal, or indicative of more serious apneatic breathing cessation events.

Apneatic breathing cessation events are generally categorized into two types: obstructive and central. Obstructive sleep apnea is the most common, followed by central and complex. Obstructive sleep apnea, as its name implies, is caused by mechanical problems during sleep that create temporary obstructions to the airway of the individual. The mechanical problems are associated with relaxation of muscle weakened muscle tone in the throat of the individual. These muscles control tissue including the soft palate, tonsils and tongue, and the muscles and/or the tissue extend into the airway enough to obstruct airflow. Lack of exercise, being overweight/obesity, cigarette smoking and alcohol/drug use, and sleeping position are contributing factors. Central sleep apnea, in contrast, occurs because the brain is not sending proper messages to respiratory muscles that control breathing (e.g., the diaphragm, abdominal and rib cage muscles). Central sleep apnea is harder to detect and is usually associated with disorders of the brain and central nervous system caused by infection, stroke, heart failure, and/or chronic use of opioids.

More detail for sleep apnea as an example of the complete breathing cessation events is as follows. During sleep, nearly all individuals experience pauses in breathing over time. When these pauses occur infrequently during sleep and last for less than 5 seconds (or approximately less than 4 interbeat times), the breathing of the individual is considered to be normal (no apnea). Pauses in breathing that last for longer than 5 seconds and occur more than 5 times per hour, however, are generally associated with sleep apnea and are also known as sleep apnea events.

Sleep apnea events in adults are typically characterized as being mild, moderate or severe. Mild sleep apnea is associated with pauses in breathing that typically last between 5 and 15 seconds, and there are typically fewer than 15 such events per hour. Moderate sleep apnea is associated with pauses in breathing that typically last between 15 and 30 seconds and there are typically between 15 and 30 such events per hour. Severe sleep apnea, on the other hand, is associated with pauses in breathing that generally exceed 30 seconds, where more than 30 events per hour can occur. It is often the case that individuals who suffer from severe sleep apnea experience 50 or more pauses in breathing events per hour.

Moderate or severe sleep apnea causes daytime fatigue and sleepiness that affects cognition and judgment, which can have significant health and workplace consequences. Individuals who experience untreated moderate or severe sleep apnea have elevated stress hormone levels, resulting in high blood pressure and increased risk of brain damage, depression, memory loss, stroke, diabetes and heart disease. It is estimated that untreated obstructive sleep apnea can shorten an individual's life from anywhere between 12 to 15 years. These individuals also pose risks to themselves and others at the workplace, and when operating machinery or a vehicle. For these reasons, early detection, diagnosis and treatment is crucial.

Then, in step 608, the snore module 140 identifies bruxism events based upon the raw biosignals and the identified snore events and stores the bruxism events to the buffer. Finally, in step 610, the snore module 140 returns the sleep data buffer including the snore events, the breathing cessation events and the bruxism events, and exits. Upon exiting, the method returns control to the end of step 222 in FIG. 2.

During each of the steps that store information during processing, the snore module 140 also stores a reference to the segment being processed, to the sleep data buffer. As noted hereinabove, the method can also store the information determined during the analysis of each set of biosignals (and each segment within each set of biosignals) to the metadata associated with each set of biosignals.

Figure 7:
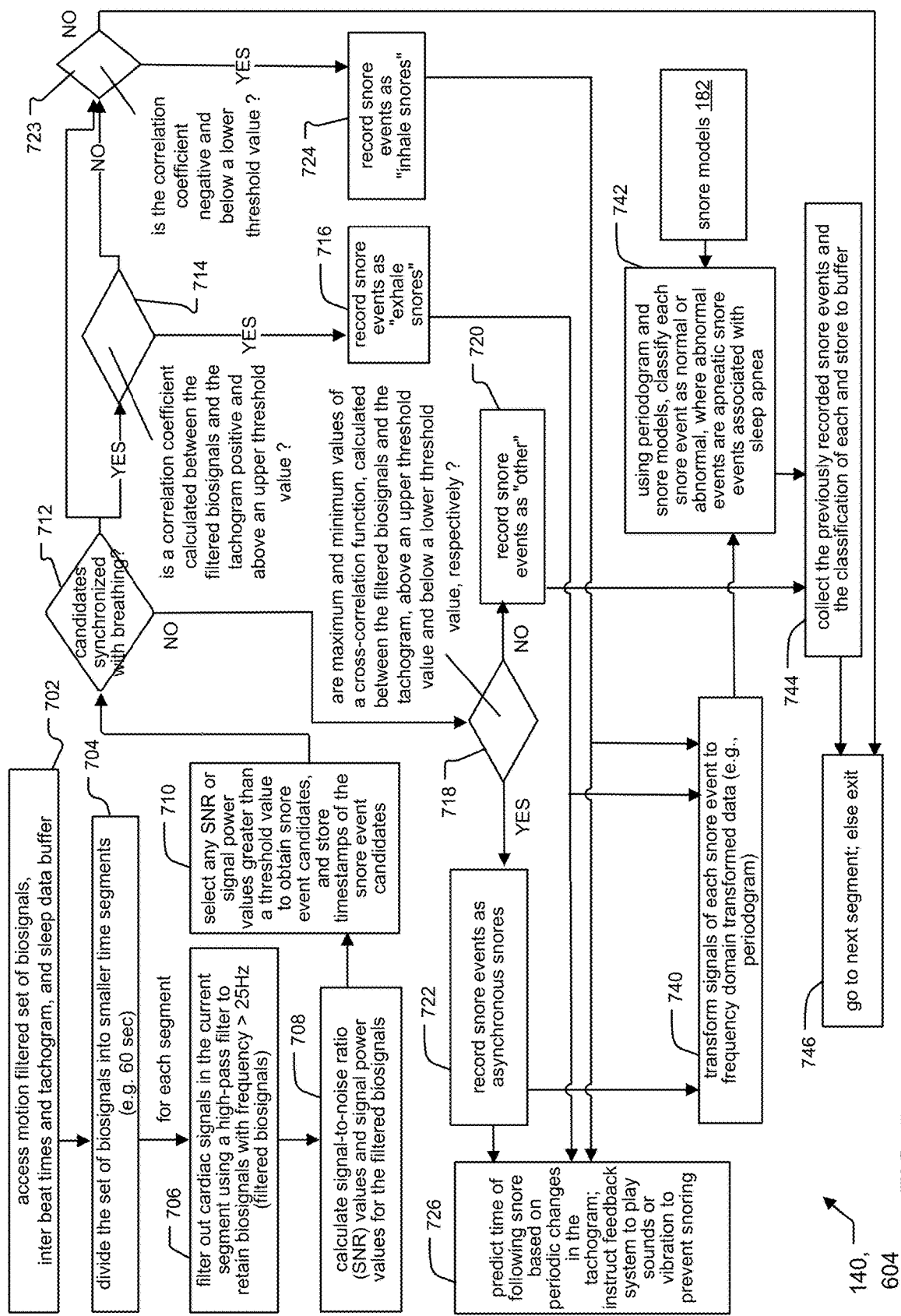
FIG. 7 is a flowchart that shows more detail for the method of FIG. 6 for identification and classification of the snore events.

FIG. 7 is a flowchart that shows more detail for step 604 in the method of FIG. 6. Generally, the flowchart describes how the snore module 140 identifies snore events within cardiac filtered versions of the biosignals 101 and classifies the snore events. To classify the snore events, the snore module 140 performs frequency domain analysis upon the snore signals of each snore event to create transformed data/transformed versions of the snore events, and classifies the snore events as normal or abnormal using snore models and the transformed data. The method begins in step 702.

According to step 702, the snore module 140 accesses the raw set of biosignals 101, the interbeat times and the tachogram calculated from the set of biosignals, and the sleep data buffer. The snore module 140, in step 704, divides the set of biosignals 101 into smaller time segments of equal length. In the illustrated example, the duration of the time segments is 60 seconds. This is done because each snore event typically lasts between one to three seconds (typically over 1-2 interbeat times), and thus multiple snore events can occur over each minute. As such, snore detection is akin to the detection of the VC peaks in the cardiac signals, which also occur over short intervals on the order of the interbeat times.

Upon conclusion of step 704, the snore module 140 prepares to process each segment in an iterative fashion and transitions to step 706. The module repeats step 706 and the steps that follow step 706 for each segment until all segments are processed.

In step 706, the snore module 140 applies a high-pass filter (e.g., 25 Hz) to the current segment to filter out the cardiac signal component, thus retaining portions of the biosignals that are above 25 Hz and attenuating portions of the biosignals below 25 Hz. The retained portions or components of the filtered biosignals include various audible signals such as snore signals. In the remaining steps, the snore module 140 determines whether the filtered biosignals are in fact snore signals, and then classifies the snore signals.

In step 708, the snore module 140 then calculates multiple signal-to-noise ratio (SNR) values and signal power values for the filtered biosignals in each segment. In one example, the snore module 140 might calculate an SNR value and a signal power value at the time of each peak in the snore signals. In another example, the snore module 140 might compute SNR values and signal power values at coarser fixed intervals of one second to as many as three seconds across each segment.

According to step 710, the snore module 140 selects signals that are likely associated with snore events, also known as snore event candidates, from the filtered biosignals and stores timestamps of the snore event candidates. The snore event candidates are defined as any SNR or signal power values greater than a threshold value (e.g., SNR>5). According to step 712, the snore module 140 determines whether the snore event candidates are synchronized with breathing of the individual 100. This is accomplished by checking if the timestamps of the snore event candidates are the same as (or within some time window of) the timestamps of the tachogram peak or trough. If so, the method transitions to step 714; if not, the method transitions to step 718.

In step 714, the snore module 140 calculates a correlation coefficient between the filtered biosignals and the tachogram created from the set of raw biosignals 101. The correlation coefficient is a statistical measure of the strength of the relationship between two variables (here, the filtered biosignals and the tachogram). The correlation coefficient is a fractional value in a range between −1.0 and 1.0. A value of −1.0 indicates a perfect negative correlation, also known as perfect anticorrelation, while a value of 1.0 indicates a perfect positive correlation (perfect correlation). Correlation coefficients are often calculated with three digits of precision after the decimal point.

Continuing with step 714, the snore module 140 determines whether the correlation coefficient is positive and above an upper threshold value, such as 0.9. This would indicate that the filtered biosignals and the tachogram are very highly correlated. If this is the case, the snore module 140 infers that the peaks of the snore signals/filtered biosignals are substantially aligned in time with the peaks in the associated tachogram. Because the peaks in the tachogram are associated with exhale times, the snore module 140 concludes that the user 100 is snoring at the same time the user is exhaling and records the snore event candidates as "exhale snores" in step 716. If the correlation coefficient does not meet these conditions, the method transitions to step 723.

At step 723, the snore module 140 determines whether the correlation coefficient is negative and less than a lower threshold value (e.g., <−0.9). Such a value for the correlation coefficient indicates very strong anticorrelation. If these conditions are met, the snore module 140 infers that the peaks of the snore signals/filtered biosignals are substantially aligned with the troughs in the associated tachogram. Because the troughs in the tachogram are associated with inhale times, the snore module 140 concludes that the user 100 is snoring at the same time the user is inhaling. If so, the method transitions to step 724 and records the snore event candidates as "inhale snores"; else, the method transitions to step 746 to either go to the next segment and repeat the processing, or exits if there are no more segments to process. Upon exiting, the method returns control to the end of step 604 in FIG. 6.

At step 718, the snore module 140 calculates a cross-correlation function between the filtered biosignals and the tachogram. The values for the cross-correlation function are in a range from −1.0 to 1.0. The snore module 140 then determines whether maximum and minimum values of the cross correlation function are above an upper threshold value (e.g., >0.9) and below a lower threshold value (e.g., <−0.9), respectively. If these conditions are met, the method transitions to step 722 and records the snore event candidates as "asynchronous snores"; else, the method transitions to step 720 and records the snore events as "other." Here, "asynchronous snores" refer to snores that are delayed with respect to the peaks or troughs in the tachogram.

Upon conclusion of both steps 716 and 724, the method transitions to both steps 740 and 726. In step 726, the snore module 140 predicts the time of the following snore based on the periodic changes in the tachogram and can instruct the biofeedback system 122 to play sounds or vibration to prevent snoring.

To predict the time of the following snore event, in more detail, the sleep system 10 determines whether the occurrence of snores are aligned with the tachogram. If so, then the patterns in the tachogram (e.g., its periodic nature, how fast it's rising/falling) can be used to estimate/predict the time of an upcoming snore. Upon conclusion of step 720, the method transitions to step 744; upon conclusion of step 722, the method transitions to step 740 and step 726.

When the method reaches step 740, the snore module 140 transforms the signals of each snore event to the frequency domain to create frequency domain transformed data of the snore events. The transformed data of the snore events may include periodograms, power spectra, and spectrograms. In the illustrated example, only periodograms are used. The method then transitions to step 742.

According to step 742, the snore module uses the periodogram and snore models 182 as input to classify the signals of each snore event as normal or abnormal, and to thus classify each snore event as normal or abnormal. Abnormal snore events are apneatic snore events/snore events associated with sleep apnea. One example of an abnormal snore event is obstructive sleep apnea. The method then transitions to step 744.

The snore models 182 are reference models for abnormal snore events such as sleep apnea. In one example, the snore models 182 include logical rules which the snore module 140 can apply to the signals of each snore event. In another example, the snore models are known signal profiles and/or reference signals of various types of snore events from literature. The snore module 140 then compares the stored signal profiles of the snore models 182 to the signals of each snore event. In still another example, the snore models can be reference templates of power spectra for different types of snores, or predetermined reference ranges for quantities measured from power spectra (e.g., ratio of power within 0-4 Hz and power within 4-10 Hz) for different types of snores. These templates and ranges can be pre-loaded by an operator of the sleep system 10 based on literature or determined from operation of the sleep system 10.

At step 744, the method collects the snore events identified and recorded in steps 716, 724, 720, 722 and 724 and the classifications (normal or abnormal) for each and stores all to the sleep data buffer. The method also stores a reference to each snore event identified in each segment to the data buffer (and possibly also to metadata maintained for each segment/for each set of biosignals that include each segment). In this way, when the snore module 140 or other modules of the data analysis system 109 access and analyze each segment, the snore module 140 or the other modules can look up any snore events previously determined and associated with each segment. Upon conclusion of step 744, the method transitions to step 746 to repeat the processing for the next segment or to exit if there are no more segments. Upon exiting, the method returns control to the end of step 604 in FIG. 6.

Figure 8:
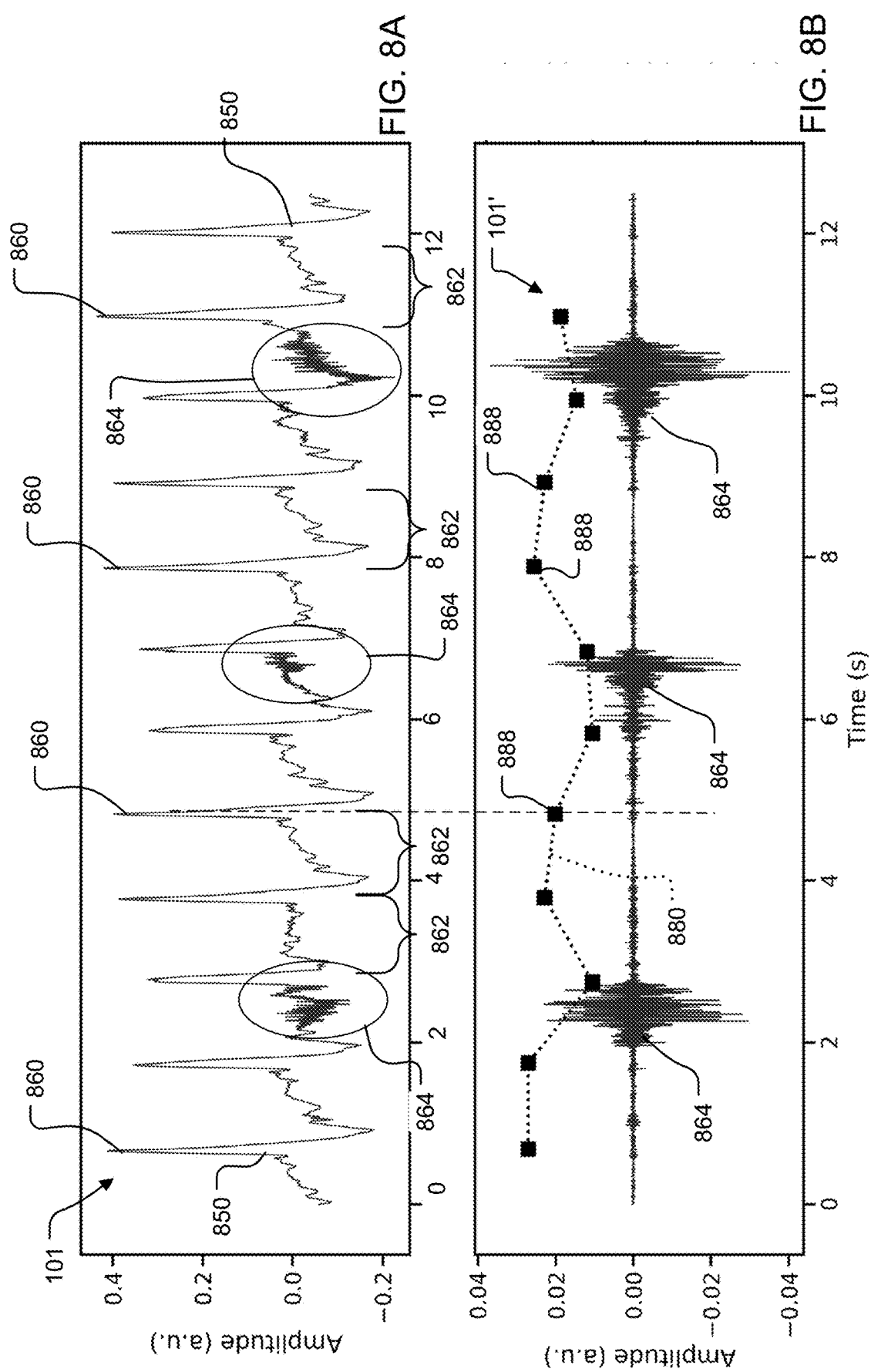
FIGS. 8A and 8B are exemplary plots of information used in the methods of FIGS. 6 and 7, where.

FIGS. 8A and 8B are plots that illustrate snore detection by the snore module 140 of the data analysis system 109. The plots are used in the methods of FIGS. 6 and 7.

FIG. 8A shows a 12-second raw biosignal segment of a sleeping user 100 of the sleep system 10. Of the biosignals 101, the majority component is the lower frequency (infrasonic) cardiac signals 850. VC peaks 860 and interbeat times 862 of the cardiac signals 850 are shown. Here, the interbeat times 862 are approximately 60 seconds, which translates into an approximate heart rate of 60 beats per second. Additionally, the biosignals 101 include higher, audible frequency components such as snore signals 864.

FIG. 8B shows a high pass filtered version of the biosignals in FIG. 8A. The filtering process attenuates or removes the cardiac signals 850 to produce filtered biosignals 101'. The filtered biosignals 101' include only audible components such as snore signals 864. In one example, the filtered biosignals include signals that are above 20 Hz. In another example, the filtered biosignals include signals that are above 25 Hz.

A tachogram 880 is also shown in the figure. The data analysis system 109 creates the tachogram 880 from the times of the interbeat times 862 in FIG. 8A and plots the tachogram 880 across the filtered biosignals 101'. Values of the tachogram 880 that are correlated with and are plotted at the same times as the VC peaks 860 of the cardiac signals 850 in FIG. 8A are indicated by reference numeral 888.

Figure 9:
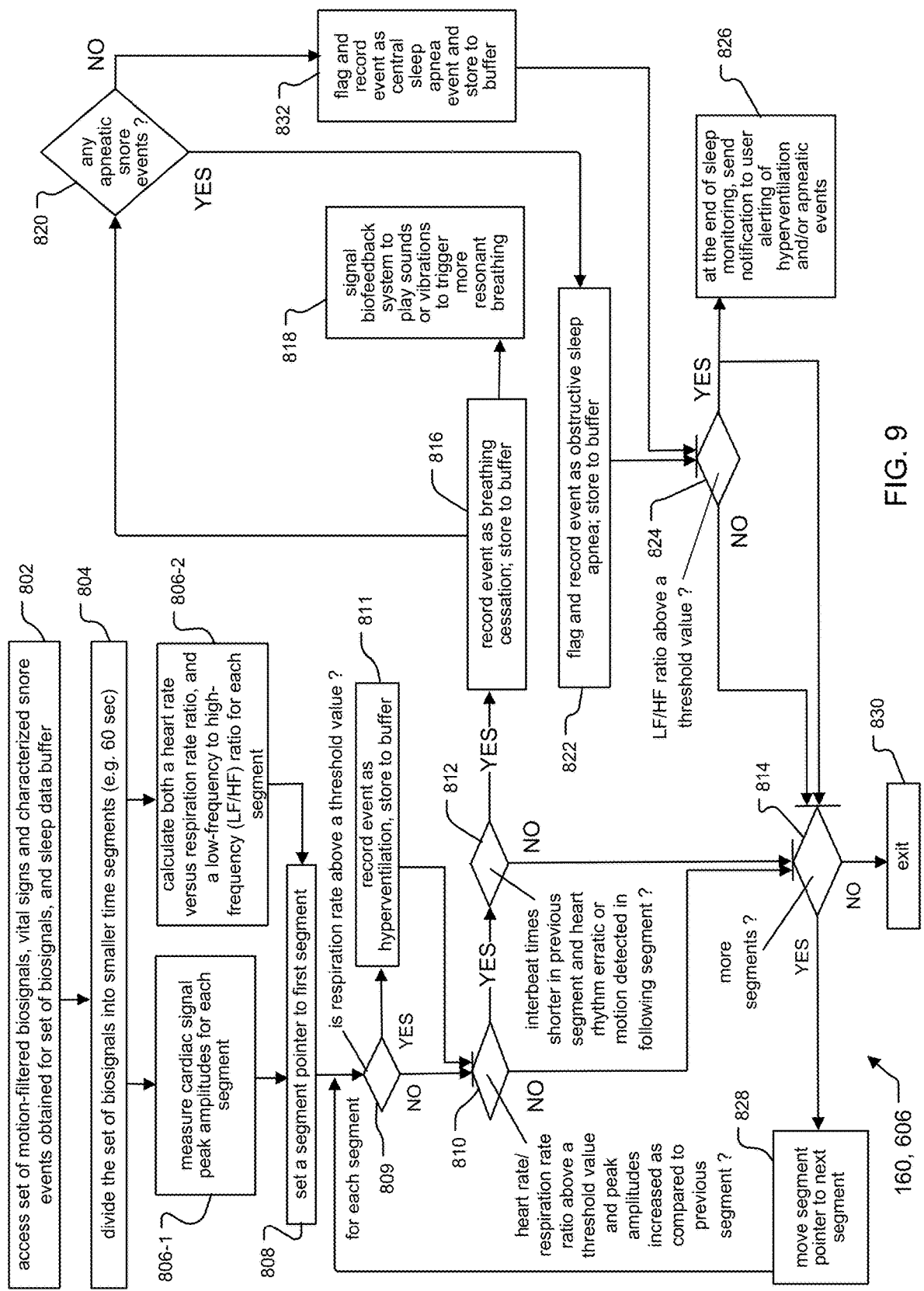
FIG. 9 is a flowchart that shows more detail for the method of FIG. 6 for identification and classification of breathing cessation events.

FIG. 9 is a flowchart that describes operation of the breathing cessation and sleep apnea detection subsystem ("breathing cessation subsystem" 160) of the snore module 140 and provides more detail for step 606 in the method of FIG. 6. The method begins in step 802.

In step 802, the breathing cessation subsystem 160 accesses the set of motion-filtered biosignals 101, the vital signs and characterized snore events obtained for the set of biosignals, and the sleep data buffer.

In step 804, the breathing cessation subsystem 160 divides the set of biosignals into smaller time segments of equal length. In the illustrated example, the duration of the time segments is 60 seconds. Upon conclusion of step 804, the breathing cessation subsystem 160 transitions to steps 806-1 and 806-2. In steps 806-1 and 806-2, the breathing cessation subsystem 160 performs preprocessing of the biosignals 101 in each segment.

When the breathing cessation subsystem 160 identifies breathing cessation events within a segment, the breathing cessation subsystem 160 can also lookup any snore events previously identified and saved by the snore module 140 for the same segment. The breathing cessation subsystem 160 stores each detected/identified breathing cessation event to the sleep data buffer, along with a reference to the segment.

In step 806-1, the breathing cessation subsystem 160 measures the cardiac signal peak amplitudes for each segment. In step 806-2, the breathing cessation subsystem 160 calculates both a ratio of heart rate versus respiration rate and a low frequency to high frequency ratio (LF/HF) for each segment. The LF/HF ratio represents a balance between the activities of the sympathetic and parasympathetic nervous systems of the individual 100. If the ratio is too high, there is an imbalance and the sympathetic nervous system portion dominates, which is an expected occurrence during sleep apnea.

Upon conclusion of steps 806-1 and 806-2, the method transitions to step 808 and initializes a segment pointer to point to the first segment of the segments. Upon conclusion of step 808, the breathing cessation subsystem 160 prepares to process each segment in an iterative fashion and transitions to step 809. The breathing cessation subsystem 160 repeats step 809 and the steps that follow step 809 for each segment until all segments are processed.

In step 809, the method determines whether the respiration rate is above a threshold value (e.g., >20 breaths per minute). An increased respiration rate is indicative of hyperventilation and can either precede or follow a breathing cessation event. If the respiration rate is not above the threshold value, the method transitions to step 810. If the respiration rate is above the threshold value, the method transitions to step 811 to record a hyperventilation event and stores the event to the sleep data buffer before transitioning to step 810.

At step 810, the method determines whether the heart rate/respiration rate ratio is above a threshold value and if the peak amplitudes of the cardiac signals 850 of the current segment have increased as compared to the previous segment. If these conditions are not met, or there is no previous segment, the method transitions to step 814; otherwise, the method transitions to step 812.

According to step 812, the method determines whether the interbeat times 862 were shorter in the previous segment and if the heart rhythm is erratic or motion detected in the following segment. If this condition is not met, or there is no previous segment or no following segment, the method transitions to step 814; otherwise, the method transitions to step 816. In step 816, the breathing cessation subsystem 160 records the event as a breathing cessation event and stores the event to the buffer. The method then transitions to step 818 to signal the biofeedback system 122 to play sounds or vibrations to trigger more resonant breathing, and also transitions to step 820 to determine if any of the breathing cessation events are apneatic snore events. An apneatic snore event is a particular kind of breathing cessation, where the biosignals 101 includes high-frequency waveform features 864 due to snoring by the user 100.

In step 820, in more detail, the method determines whether any of the breathing cessation events are associated with apneatic snore events. The method accomplishes this by checking the sleep data buffer for any recorded abnormal snore events (steps 742 and 744 of FIG. 7) that were identified for the same time segment as the current time segment the method is processing. If the breathing cessation events are not associated with apneatic snore events, the method transitions to step 832; else, the method transitions to step 822.

At step 832, the method flags and records the event as a central sleep apnea event and stores the event to the sleep data buffer. Upon conclusion of step 832, the method transitions to step 824.

In step 822, the method flags and records an obstructive sleep apnea event for the segment and stores the event to the buffer. According to step 824, the method determines whether the LF/HF ratio is above a threshold value. If the value of the LF/HF ratio is above the threshold value, the method transitions to both steps 826 and 814; otherwise, the method transitions to step 814.

In step 826, at the end of sleep monitoring, the method sends a notification message 111 to the user/individual. The message alerts the individual 100 that one or more hyperventilation and/or apneatic events were found. In step 814, which is the final processing step for the current segment, the method determines whether there are more segments to process. If there are more segments, the method transitions to step 828 and moves the segment pointer to the next segment. Control of the method then resumes at the beginning of step 809 to process the next segment. If there are no more segments to process at step 814, the method transitions to step 830 and exits. Upon exiting, the method returns control to the end of step 606 in FIG. 6.

During each of the steps that store information during processing, the breathing cessation subsystem 160 also stores a reference to the segment being processed, to the sleep data buffer. As noted hereinabove, the subsystem 160 can also store the information determined during the analysis of each set of biosignals (and each segment within each set of biosignals) to the metadata associated with each set of biosignals.

As a result, the data analysis system 109 identifies the snore events by determining that a noise level of the audible signals exceeds a threshold value and that the audible signals are synchronized with breathing, and classifies the snore events as apneatic by calculating frequency domain transformed versions of the biosignals, and checking the transformed versions of the biosignals against snore models that include reference signals for known apneatic snoring events of individuals.

FIG. 10A-10C are exemplary plots of biosignals 101 and associated tachograms 880 over a continuous 90-second period. The in-ear biosensor system 102 obtains the biosignals 101 for an individual 100 diagnosed with obstructive sleep apnea.

After obtaining the biosignals 101, the in-ear biosensor system 102 sends the biosignals 101 to the snore module 140 for analysis. The analysis is performed in accordance with the methods of FIG. 6 and FIG. 9 to determine breathing cessation events in the biosignals. Tachograms 880A, 880B and 880C are created from the cardiac signals 850 in each of FIGS. 10A-10C and are respectively plotted across the biosignal plots in these figures.

In more detail, FIG. 10A shows the biosignals 101 of the individual 100 and associated tachogram 880A over the first 30 seconds. Here, the individual 100 is breathing normally, and thus the biosignals 101 and tachogram 880A are associated with a normal breathing event. Values of the VC peaks 860 of the cardiac signals 850 of the biosignals 101 have a strong correlation to the values of the points 888 in the tachogram 880A. Oscillations in the tachogram 880A due to RSA (respiratory sinus arrhythmia) and in the amplitudes of the cardiac signals 850 due to respiration (changes in stroke volume) are shown. The interbeat times 862 are approximately the same value from one beat to another and across the entire 30 second sample (here, about 1.2 sec). This corresponds to a heart rate of about 50 beats/minute.

FIG. 10B shows biosignals 101 during a "no breathing" event. In the illustrated example, the pause in breathing lasts about 35 seconds. As compared to the biosignals 101 in FIG. 10A, the VC peaks 860 of the cardiac signals 850 in FIG. 10B steadily decrease in value over time and are less correlated with the values of the points 888 in tachogram 880B. There is also less variation in the cardiac signals 850 and in the tachogram 880B because the individual is not respirating (breathing).

When an individual 100 is not breathing, the amount of oxygen in the blood drops. In response, the individual's autonomic nervous system intervenes. The brain signals the nervous system to constrict the blood vessels and heart so that more blood reaches the brain. As a result, the heart rate increases. This is shown in FIG. 10B, where the interbeat times 862 are now shorter (about 1 sec) than in FIG. 10A. This corresponds to a heart rate of about 60 beats/minute.

FIG. 10C shows the biosignals 101 and associated tachogram 880C over the last 25 seconds of the 90-second sample, during a "resumption of breathing" event. In the leftmost part of the figure, the last two seconds of the "non-breathing" plot of FIG. 10B are repeated for continuity and are indicated by reference 899-1. Then, at around 66 seconds, breathing resumes somewhat violently with a loud gasp and/or jerk of the individual's body, during which the individual's heart rhythm is immediately erratic and the tachogram 880C quickly rises above the amplitude scale of the plot. The erratic heart rhythm continues until the individual's breathing settles into a normal pattern at about 85 seconds. Reference 899-2 indicates the time period during which the individual's breathing initially resumes and then settles into a normal breathing pattern, while reference 899-3 indicates a time period of normal breathing thereafter.

The snore module 140 can identify breathing cessation events based upon changes in the biosignals 101/cardiac signals 850 over time. For this purpose, the snore module 140 can identify the time periods 899-1 through 899-3 over which the individuals' breathing transitions from normal to non-breathing and back to normal again, and can identify and analyze motion artifacts within the biosignals 101/cardiac signals 850 across the different time periods 899 to identify and characterize sleep apnea.

Figure 11:
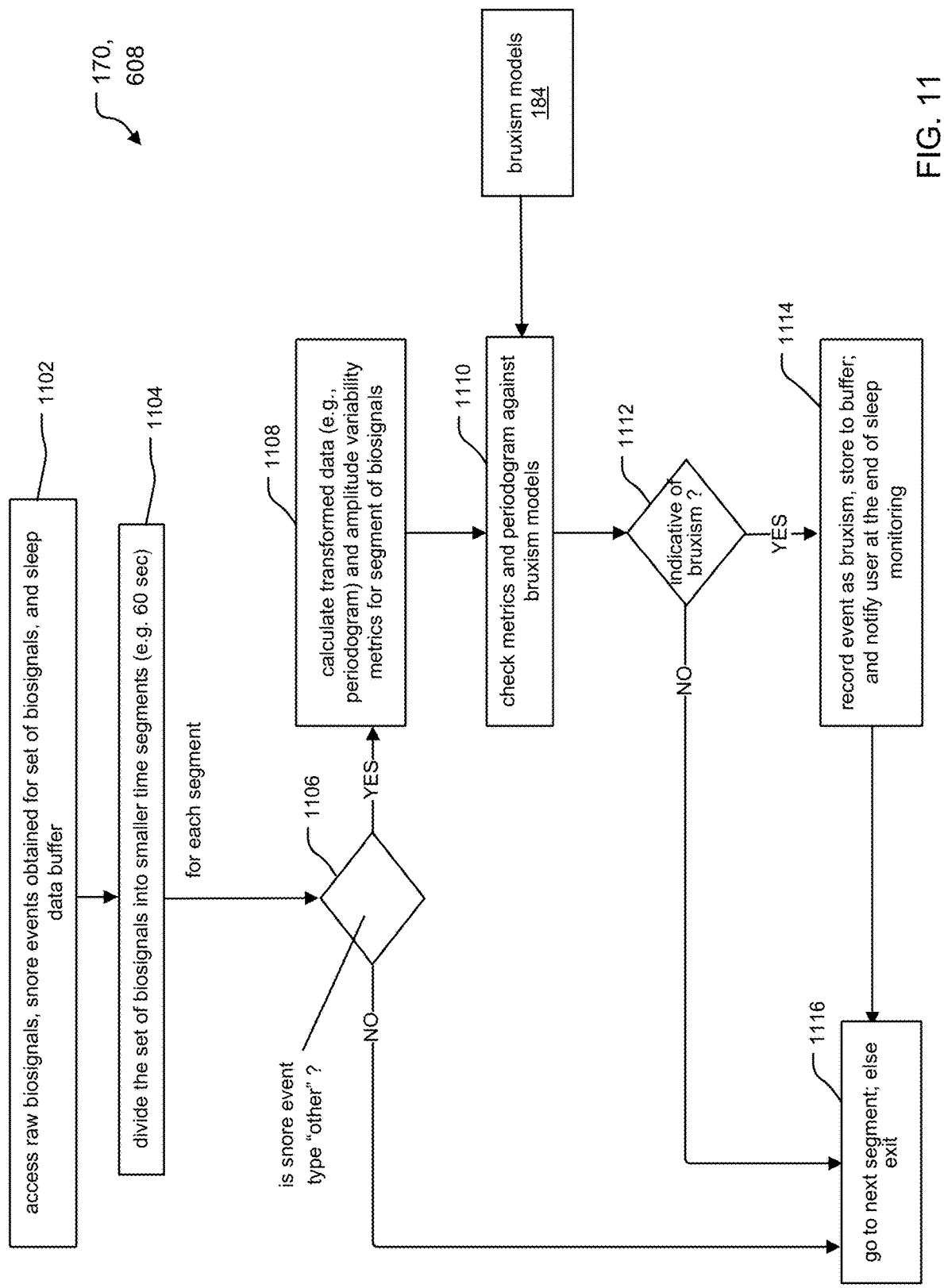
FIG. 11 is a flowchart that shows more detail for the method of FIG. 6 for identification and classification of bruxism events.

FIG. 11 is a flowchart that describes operation of the bruxism detection subsystem ("bruxism subsystem" 170) of the snore module 140 and provides more detail for step 608 in the method of FIG. 6. The method begins in step 1102.

According to step 1102, the bruxism subsystem 170 accesses the set of raw biosignals, any snore events obtained and recorded for the set of biosignals in the sleep data buffer, and the sleep data buffer. In step 1104, the method divides the set of biosignals 101 into smaller time segments of equal length. In the illustrated example, the duration of the time segments is 60 sec.

Upon conclusion of step 1104, the bruxism subsystem 170 prepares to process each segment in an iterative fashion and transitions to step 1106. The module repeats step 1106 and the steps that follow step 1106 for each segment until all segments are processed.

In step 1106, the method determines whether a snore event previously recorded for the segment in the method of FIG. 9 was "other." If not, no bruxism events exist and the method transitions to step 1116 to process the next segment. Otherwise, the method transitions to step 1108.

In step 1108, the bruxism subsystem 170 calculates transformed data (e.g., periodogram, power spectra, spectrogram) and amplitude variability metrics for the current segment of biosignals. In the illustrated example, only the periodogram is used. In step 1110, the method checks the metrics and the periodogram against one or more bruxism models 184. Here, the bruxism models 184 are either logical rules or a series of reference bruxism signals obtained from literature, in examples. In another example, the bruxism models could include bruxism events from multiple individuals obtained via the sleep system 10.

In step 1112, if the result of the operation in step 1112 is indicative of bruxism, the method transitions to step 1114;

else the method transitions to step 1116. Here, the metrics calculated in step 1108 are indicative of bruxism when their values exceed amplitude variability metrics in the bruxism models 184, in one example. In step 1114, the bruxism subsystem 170 records the event as bruxism, stores the event to the sleep data buffer along with a reference to the segment, and notifies the user at the end of sleep monitoring. In step 1116, the method accesses the next segment and processes the next segment in step 1104, or exits the method if there are no more segments to process. Upon exiting, the method returns control to the end of step 608 in FIG. 6.

During each of the steps that store information during processing, the bruxism subsystem 170 also stores a reference to the segment being processed, to the sleep data buffer. As noted hereinabove, the subsystem 170 can also store the information determined during the analysis of each set of biosignals (and each segment within each set of biosignals) to the metadata associated with each set of biosignals.

In this way, the data analysis system 109 classifies the bruxism events by calculating frequency domain transformed versions of the biosignals 101 over time periods and amplitude variability metrics of the biosignals for the same time periods, and checking the metrics and the transformed versions of the biosignals against snore models that include reference signals for known bruxism events of individuals 100.

Figure 12:
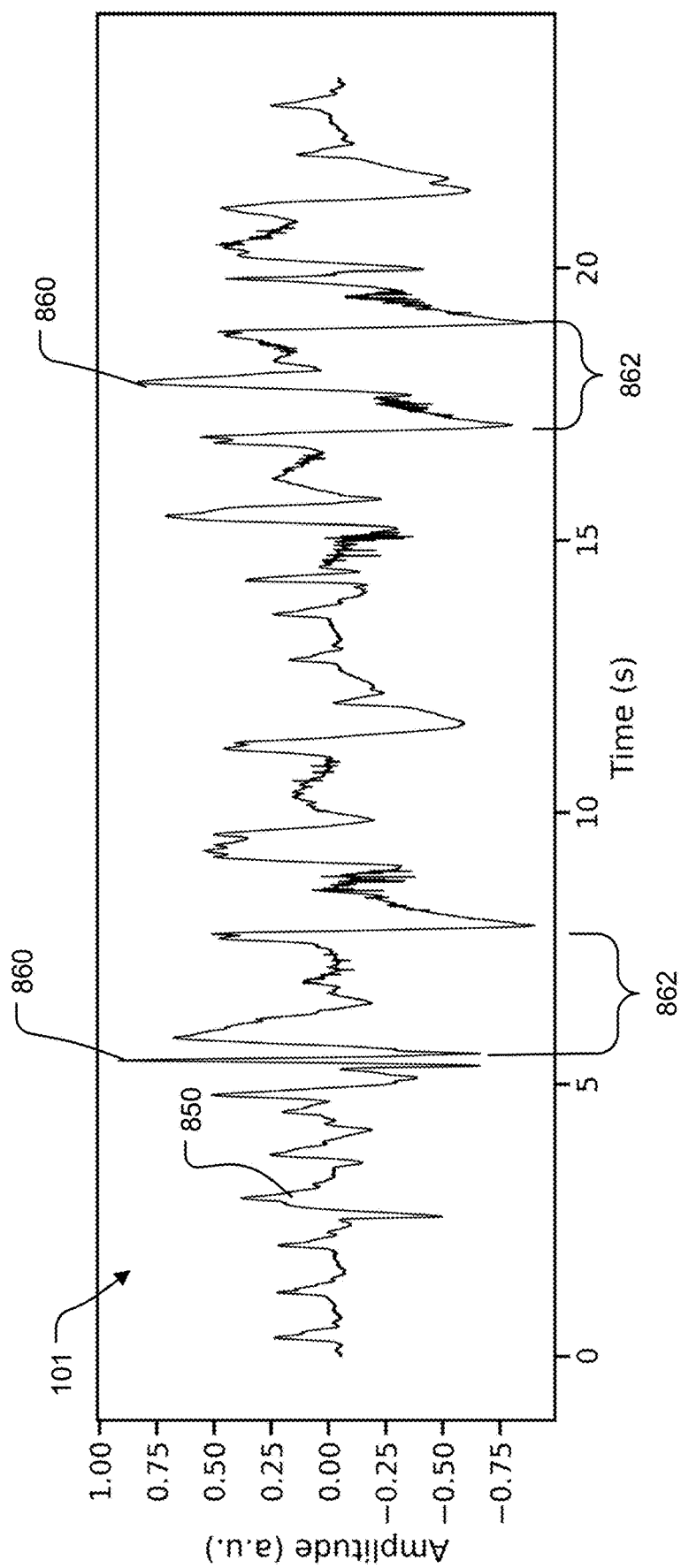
FIG. 12 is a biosignal plot that includes bruxism events, which the method of FIG. 11 can detect upon analyzing the biosignals.

FIG. 12 is an exemplary plot of biosignals 101 of an individual 100 during a teeth grinding event (i.e. bruxism). The method of FIG. 11 can identify the bruxism events based upon analysis of the biosignals. In the illustrated example, the large amplitude variations in the biosignals 101 are due to jaw motion and high-frequency components from teeth impacts.

While this invention has been particularly shown and described with references to preferred embodiments thereof, it will be understood by those skilled in the art that various changes in form and details may be made therein without departing from the scope of the invention encompassed by the appended claims.

What is claimed is:

1. A non-invasive sleep monitoring and reporting system, the system comprising:
    an in-ear biosensor system that includes:
        a first earbud placed at or within an ear canal of an individual, wherein the first earbud includes an acoustic sensor that detects biosignals including infrasonic signals and audible signals from the individual in the ear canal; and
        a second earbud placed in or at a right ear canal of the individual and that includes an acoustic sensor that detects the biosignals including the infrasonic and audible signals from the individual in the right ear canal, and wherein the first earbud is placed in or at a left ear canal of the individual; and
    a data analysis system that receives the biosignals from the biosensor system, determines whether the individual is awake or asleep based on the biosignals, and analyzes the biosignals to identify and monitor physiological information of the individual during sleep;
    wherein the physiological information includes sleep position information of the individual that the data analysis system determines based on changes in amplitudes of the biosignals detected in the left ear canal relative to changes in amplitudes of the biosignals detected in the right ear canal; and
    wherein the physiological information includes sleep events including snore events, breathing cessation events and bruxism events, and wherein the data analysis system is configured to:
        detect and classify the snore events based upon infrasonic signal filtered versions of the biosignals;
        detect and classify the breathing cessation events based at least upon the infrasonic signals of the biosignals; and
        detect and classify the bruxism events based upon the infrasonic signals and the audible signals of the biosignals.

2. The system of claim 1, wherein the data analysis system induces changes to the physiological information using external stimuli including white noise to improve a quality of sleep of the individual.

3. The system of claim 1, wherein the physiological information includes sleep stages that the data analysis system detects and classifies based upon the biosignals.

4. The system of claim 3, wherein the data analysis system identifies and extracts information from the biosignals including interbeat times, cardiac signals and waveform features, calculates tachograms from the interbeat times, determines vital signs from the extracted information and the tachograms, and monitors changes to the vital signs to detect and classify the sleep stages.

5. The system of claim 3, wherein the data analysis system obtains frequency domain transformed data from the biosignals and the interbeat times, derives additional waveform features from the transformed data, and passes the additional waveform features along with the waveform features of the extracted information as input to one or more machine learning models to detect and classify the sleep stages.

6. The system of claim 1, wherein the data analysis system classifies the bruxism events by calculating frequency domain transformed versions of the biosignals over time periods and amplitude variability metrics of the biosignals for the same time periods, and checking the metrics and the transformed versions of the biosignals against snore models that include reference signals for known bruxism events of individuals.

7. The system of claim 1, wherein the physiological information includes sleep apnea that the data analysis system detects by classifying the snore events as apneatic snore events over time periods, and determining that the breathing cessation events occur over the same time periods.

8. The system of claim 1, wherein the physiological information includes insomnia that the data analysis system detects by tracking awake and sleep states derived from the biosignals.

9. The system of claim 1, wherein the first earbud or the second earbud includes a motion sensor that detects movement of the individual and the in-ear biosensor system sends the detected motion with the biosignals to the data analysis system for analysis, and wherein the data analysis system detects motion-related sleep disorders including periodic limb movement disorder and restless leg syndrome based upon the detected motion.

10. A method for non-invasive monitoring of an individual using an in-ear biosensor system, the method comprising:
    detecting biosignals including infrasonic signals and audible signals from the individual in an ear canal of the individual, via an acoustic sensor of a first earbud of the in-ear biosensor system placed at or within an ear canal of the individual;
    detecting biosignals including infrasonic signals and audible signals from the individual in a right ear canal of the individual, via an acoustic sensor of a second earbud of the in-ear biosensor system placed at or within the right ear canal, the first earbud being placed in or at a left ear canal of the individual;

receiving the detected biosignals from the acoustic sensor, determining whether the individual is awake or asleep based on the biosignals, and analyzing the biosignals to identify and monitor physiological information of the individual during sleep; and determining sleep position information of the physiological information based on changes in amplitudes of the biosignals detected in the left ear canal relative to changes in amplitudes of the biosignals detected in the right ear canal; and detecting and classifying sleep events including snore events, breathing cessation events and bruxism events of the physiological information, the detecting and classifying of the snore events being based upon infrasonic signal filtered versions of the biosignals, the detecting and classifying of the breathing cessation events being based upon at least the infrasonic signals of the biosignals, and the detecting and classifying of the bruxism events being based upon the infrasonic signals and the audible signals of the biosignals.

11. The method of claim 10, further comprising inducing changes to the physiological information using external stimuli including white noise to improve a quality of sleep of the individual.

12. The method of claim 10, further comprising detecting and classifying sleep stages of the physiological information based upon the biosignals.

13. The method of claim 12, wherein detecting and classifying sleep stages of the physiological information based upon the biosignals comprises identifying and extracting information from the biosignals including interbeat times, cardiac signals and waveform features, calculating tachograms from the interbeat times, determining vital signs from the extracted information and the tachograms, and monitoring changes to the vital signs.

14. The method of claim 13, wherein detecting and classifying sleep stages of the physiological information based upon the biosignals comprises obtaining frequency domain transformed data from the biosignals and the interbeat times, deriving additional waveform features from the transformed data, and passing the additional waveform features along with the waveform features of the extracted information as input to one or more machine learning models to detect and classify the sleep stages.

15. The method of claim 10, further comprising detecting sleep apnea physiological information by classifying the snore events as apneatic snore events over time periods, and determining that the breathing cessation events occur over the same time periods.

16. The method of claim 10, further comprising detecting insomnia physiological information by tracking awake and sleep states derived from the biosignals.

17. The method of claim 10, further comprising a motion sensor included within the first earbud or the second earbud detecting movement of the individual, the in-ear biosensor system sending the detected motion with the biosignals for analysis, and detecting motion-related sleep disorders including periodic limb movement disorder and restless leg syndrome based upon the detected motion.

* * * * *